United States Patent
White et al.

(10) Patent No.: US 8,234,592 B2
(45) Date of Patent: Jul. 31, 2012

(54) DISPLAYING SCALED-DOWN VERSIONS OF DOCUMENTS ON FAVORITES AND RECENT MENU

(75) Inventors: Christopher M. White, San Francisco, CA (US); Phillip Y. Goldman, Los Altos, CA (US); David R. Anderson, Cupertino, CA (US); Keith R. Ohlfs, San Jose, CA (US); Bruce A. Leak, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1199 days.

(21) Appl. No.: 12/033,790

(22) Filed: Feb. 19, 2008

(65) Prior Publication Data

US 2008/0141120 A1    Jun. 12, 2008

Related U.S. Application Data

(60) Continuation of application No. 11/053,003, filed on Feb. 7, 2005, now Pat. No. 7,350,155, which is a continuation of application No. 09/867,366, filed on May 29, 2001, now Pat. No. 6,891,553, which is a continuation of application No. 09/669,345, filed on Sep. 26, 2000, now abandoned, which is a division of application No. 09/280,606, filed on Mar. 29, 1999, now Pat. No. 6,133,913, which is a division of application No. 08/660,088, filed on Jun. 3, 1996, now Pat. No. 6,034,689.

(51) Int. Cl.
    *G06F 17/30*    (2006.01)

(52) U.S. Cl. ......................................... 715/838; 715/749
(58) Field of Classification Search .................. 715/749, 715/784, 838, 800–805, 811, 815, 745, 821–825, 715/762, 763, 760, 748
See application file for complete search history.

(56) References Cited

U.S. PATENT DOCUMENTS

| | | | | |
|---|---|---|---|---|
| 5,737,599 A | * | 4/1998 | Rowe et al. | 1/1 |
| 5,758,257 A | * | 5/1998 | Herz et al. | 725/116 |
| 5,781,785 A | * | 7/1998 | Rowe et al. | 715/234 |
| 5,845,084 A | * | 12/1998 | Cordell et al. | 709/234 |
| 5,963,964 A | * | 10/1999 | Nielsen | 715/255 |
| 6,263,501 B1 | * | 7/2001 | Schein et al. | 725/39 |

* cited by examiner

*Primary Examiner* — Steven Sax
(74) *Attorney, Agent, or Firm* — Workman Nydegger

(57) ABSTRACT

A system for accessing the World Wide Web or other information sources using the Internet incorporates scaled-down versions of images associated with recently-viewed documents or documents designated as favorites into a recent menu or a favorites menu, respectively. As a user accesses a Web page, a scaled-down version of the Web page is inserted into a recent menu. The user can view the recent menu and visually determine the identity of the recently-viewed Web pages, which allows the user to conveniently select Web pages to access. This recent menu also enables the user to access recently-viewed documents in any order, which does not need to be in the chronological order in which the pages were originally viewed or in a reverse chronological order. Scaled-down versions of Web pages designated as favorites are stored in the favorites menu, thereby assisting the user in recalling the content of the favorite documents.

22 Claims, 18 Drawing Sheets

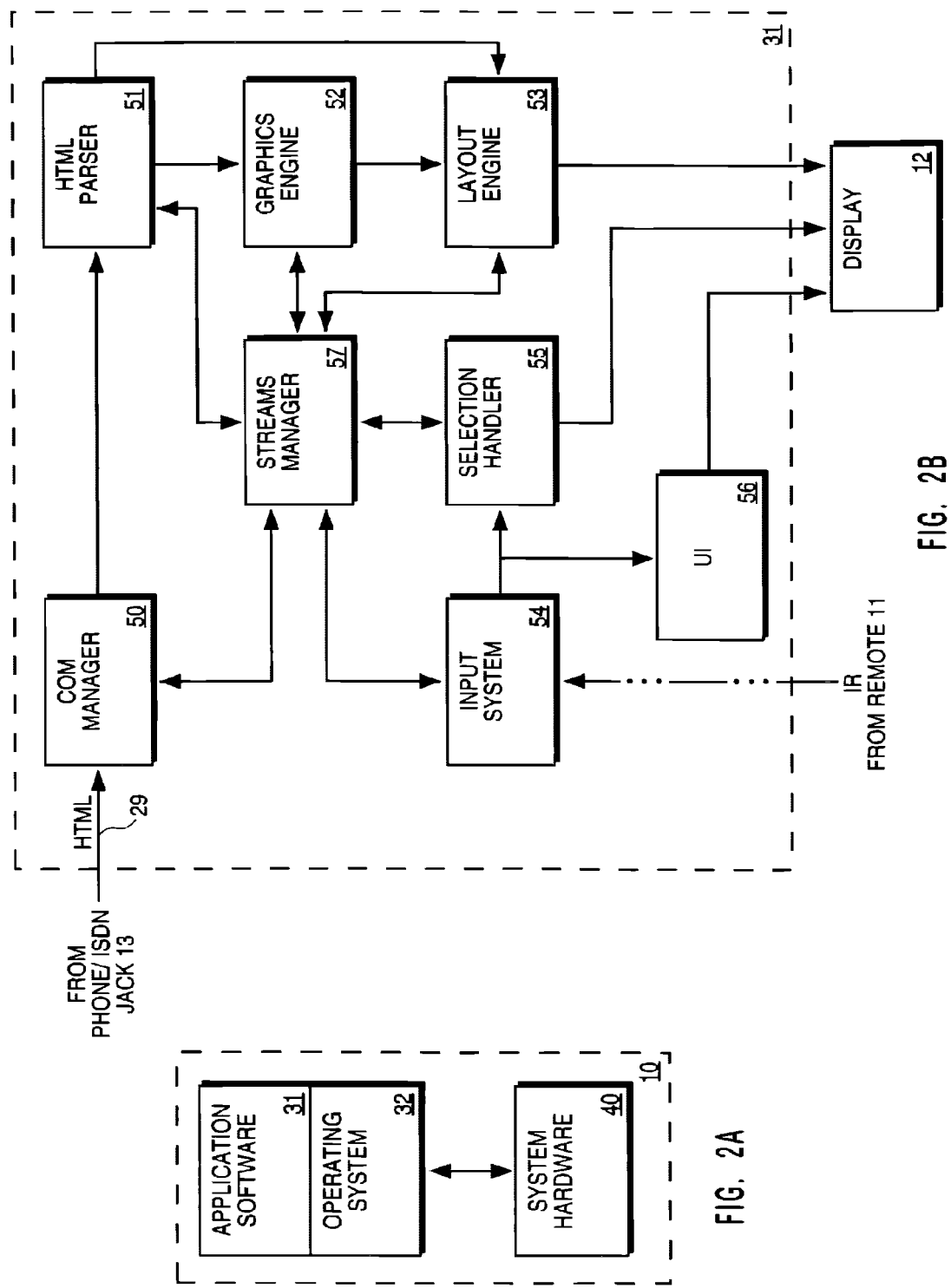

DISPLAYING SCALED-DOWN VERSIONS OF DOCUMENTS ON FAVORITES AND RECENT MENU

RELATED APPLICATIONS

This application is a continuation of U.S. patent application Ser. No. 11/053,003, filed Feb. 7, 2005, entitled "Resizing Internet Document for Display on Television Screen," now issued as U.S. Pat. No. 7,350,155, which is a continuation of U.S. patent application Ser. No. 09/867,366, filed May 29, 2001, entitled "Resizing Internet Document for Display on Television Screen," now issued as U.S. Pat. No. 6,891,553 which is a continuation of U.S. patent application Ser. No. 09/669,345, filed Sep. 26, 2000 now abandoned, entitled "Displaying Scaled-Down Versions of Documents on Favorites and Recent Menu," which is a divisional of U.S. patent application Ser. No. 09/280,606, filed Mar. 29, 1999, entitled "Methods of Scaling and Displaying a Server-Provided Image," now issued as U.S. Pat. No. 6,133,913, which is a divisional of U.S. patent application Ser. No. 08/660,088, filed Jun. 3, 1996, entitled "Web Browser Allowing Navigation Between Hypertext Objects Using Remote Control," now issued as U.S. Pat. No. 6,034,689. The foregoing patent and patent applications are incorporated herein by reference in their entireties.

BACKGROUND OF THE INVENTION

1. The Field of the Invention

The present invention pertains to the field of user interfaces for accessing remotely stored information over a network. More particularly, the present invention relates to displaying scaled-down images of various Web pages, such as recent Web pages or favorite Web pages, along with the title of each Web page.

2. The Prior State of the Art

The number of homes and businesses using personal computers has increased substantially in recent years, and along with this increase has come an explosion in the use of the Internet, and particularly the World-Wide Web (Web). The Web is a collection of formatted hypertext pages located on numerous computers around the world that are logically connected by the Internet. Although the Web has in the past been a source of primarily scientific information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population.

A problem associated with the prior art is that, in some cases, images that are downloaded via a network connection are not appropriately sized for the display being used. One prior art solution for dealing with Web pages larger than the display is to allow horizontal and vertical scrolling. However, it has been found that horizontal scrolling can be confusing to many people. Therefore, it would be advantageous to provide a solution to displaying oversized image maps that eliminates the need for horizontal scrolling.

In addition, Web browsers in the prior art have various other disadvantages that are overcome by the present invention, as described in the detailed description which follows.

SUMMARY OF THE INVENTION

As described below, a client-server system includes a client in communication with a server. For example, the client server system may be for accessing the World Wide Web (Web) in response to commands from the user. The client includes a processor and uses a display device to display a server-provided image to the user. In one implementation, the invention includes a scaling operation to reduce the image size of all Web page elements to fit within the horizontal dimension of a television-formatted display. Since it is desirable to retain uniform proportions, the scaling operation is performed on both the horizontal and vertical dimensions using the same scale factor. However, the scaling factor is based only upon the amount of scaling necessary to fit the Web page within the horizontal borders of a television display. Thus, the only user scrolling operation required by the present invention is vertical scrolling.

In one implementation of the invention, the display can include scaled-down images of various Web pages, such as recent Web pages or favorite Web pages, along with the title of each Web page. The user can directly access any Web site represented in the display by selecting one of the scaled-down images.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 2A illustrates the functional relationship between hardware and software in the client processing system of FIG. 1A.

FIG. 2B is a block diagram of the Web browser application software of FIG. 2B.

DETAILED DESCRIPTION OF PREFERRED EMBODIMENTS

A method and apparatus are described for allowing a user to navigate between a plurality of hypertext objects displayed on a display device using a remote input device. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

As will be described in greater detail below, the present invention includes steps for implementing a Web browser that allows a user to navigate through hypertext objects included in a World-Wide Web (hereinafter "Web") page using a remote control. The user is not required to identify or locate hypertext objects; rather, the system of the present invention performs this function for the user. In the preferred embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention is included in a system known as WebTV™, which uses a standard television set as a display device for browsing the Web and which connects to a conventional network, such as the Internet, using standard telephone, ISDN, or similar communication lines. In accordance with the present invention, a user of a WebTV™ client system can utilize WebTV™ network services provided by one or more remote WebTV™ servers. The WebTV™ network services can be used in conjunction with software running in a WebTV™ client system to browse the Web, send electronic mail, and to make use of the Internet in various other ways.

Figure 1A:
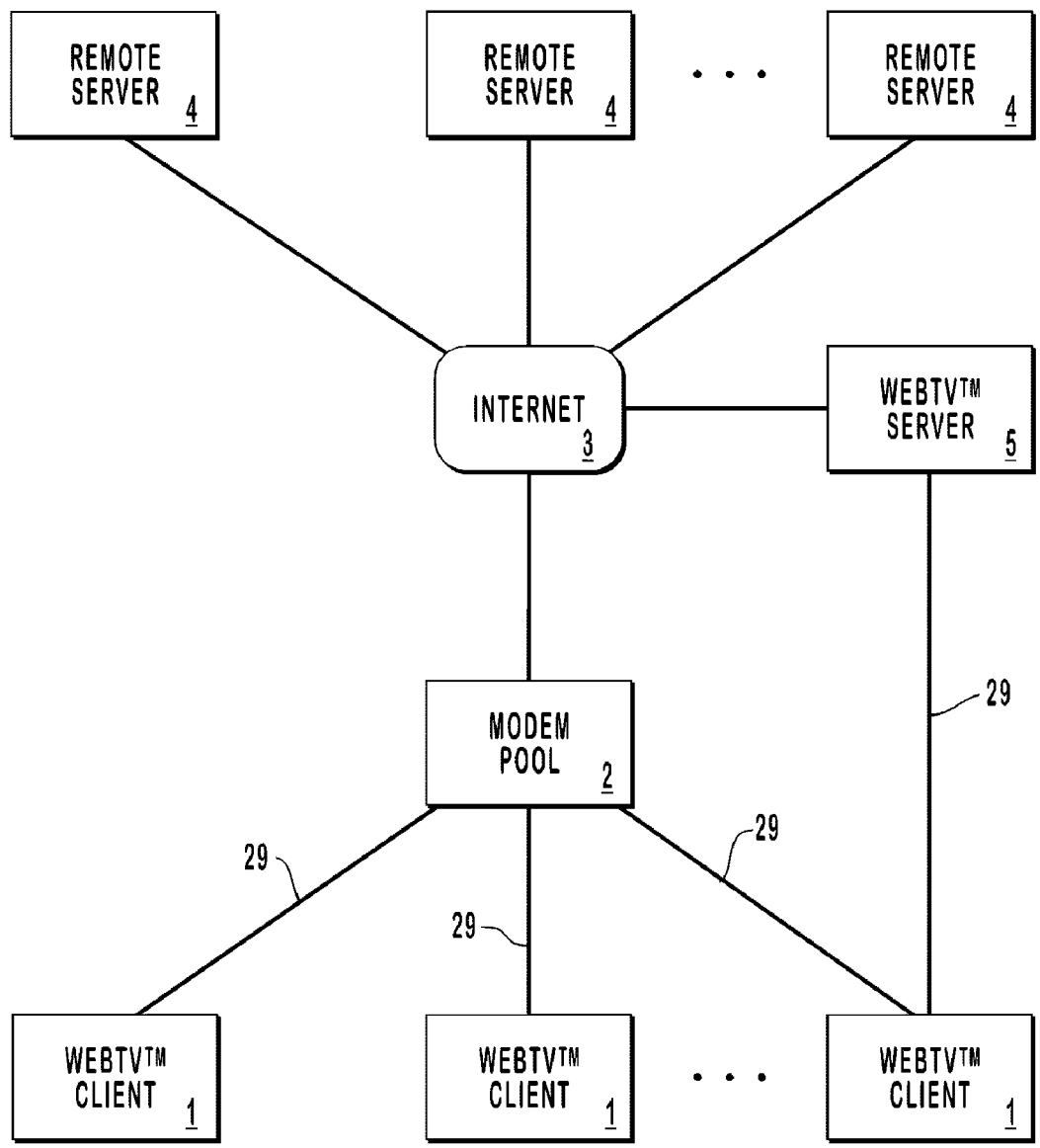
FIG. 1A illustrates several WebTV™ client systems connected to a WebTV™ server system.

FIG. 1 illustrates a basic configuration of the WebTV™ network according to one embodiment. A number of WebTV™ clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks.

1. Client System Architecture

Figure 1B:
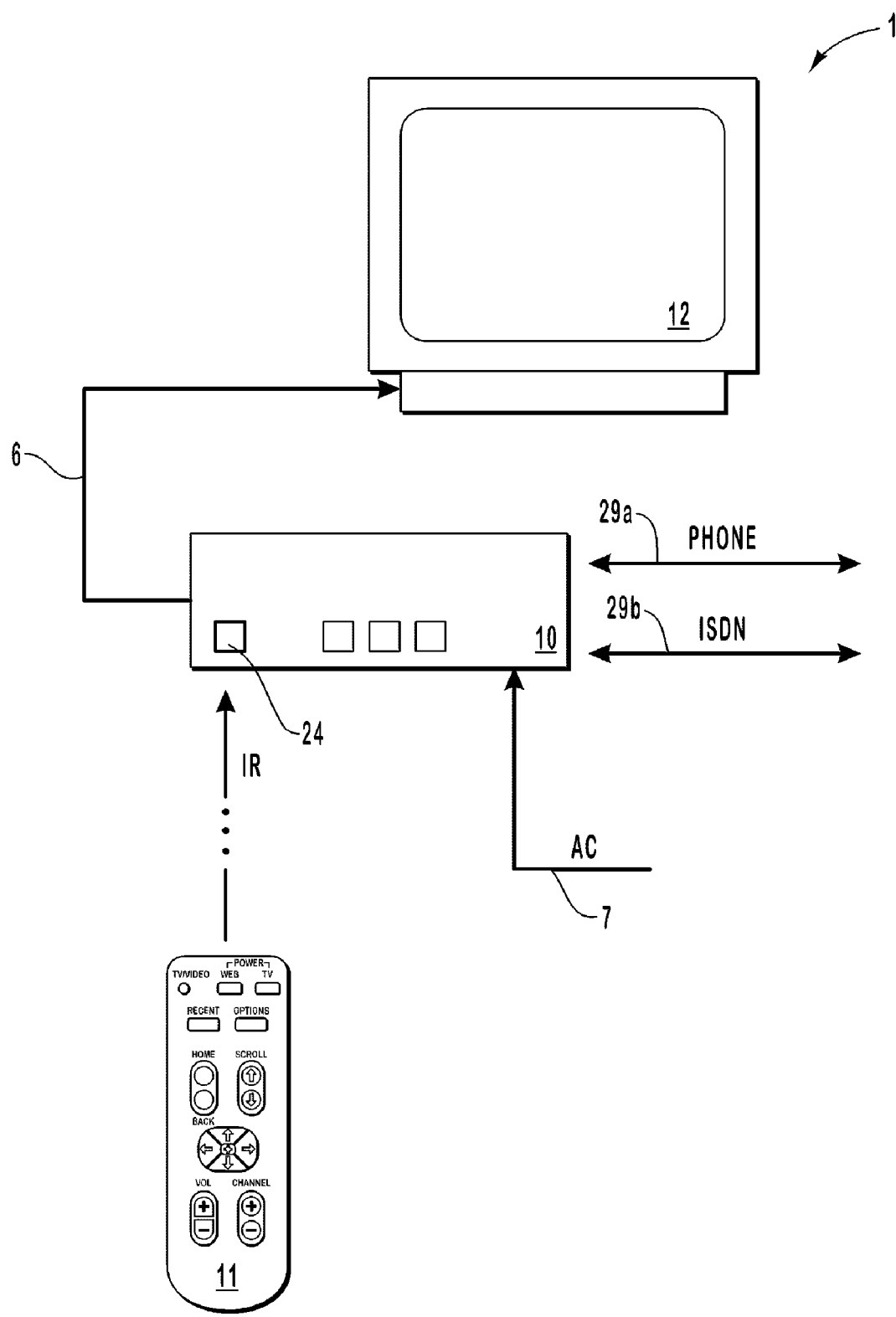
FIG. 1B illustrates a WebTV™ client system.

FIG. 1B illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send e-mail, and otherwise access the Internet.

The WebTV™ client 1 uses the television set 12 as a display device. The WebTV™ box 10 is coupled to the television set 12 by a video link 6. The video link 6 is an RF (radio frequency), S-video, composite video, or other equivalent form of video link. The communication link 29 between the WebTV™ box 10 and the server 5 is either a telephone (POTS) connection 29a or an ISDN connection 29b. The WebTV™ box 10 receives AC (alternating current) power through an AC power line 7.

Remote control 11 is operated by the user in order to control the WebTV™ client 1 in browsing the Web, sending e-mail, and performing other Internet-related functions. The WebTV™ box 10 receives commands from remote control 11 via an infrared (IR) communication link. In alternative embodiments, the link between the remote control 11 and the WebTV™ box 10 may be RF or any equivalent mode of transmission.

The WebTV™ box 10 includes application software which, when executed by a processor in the box 10, provides the user with a graphical user interface by which the user can access the WebTV™ network services and browse the Web. The application software is automatically executed upon application of power to the WebTV™ box 10.

Figure 1C:
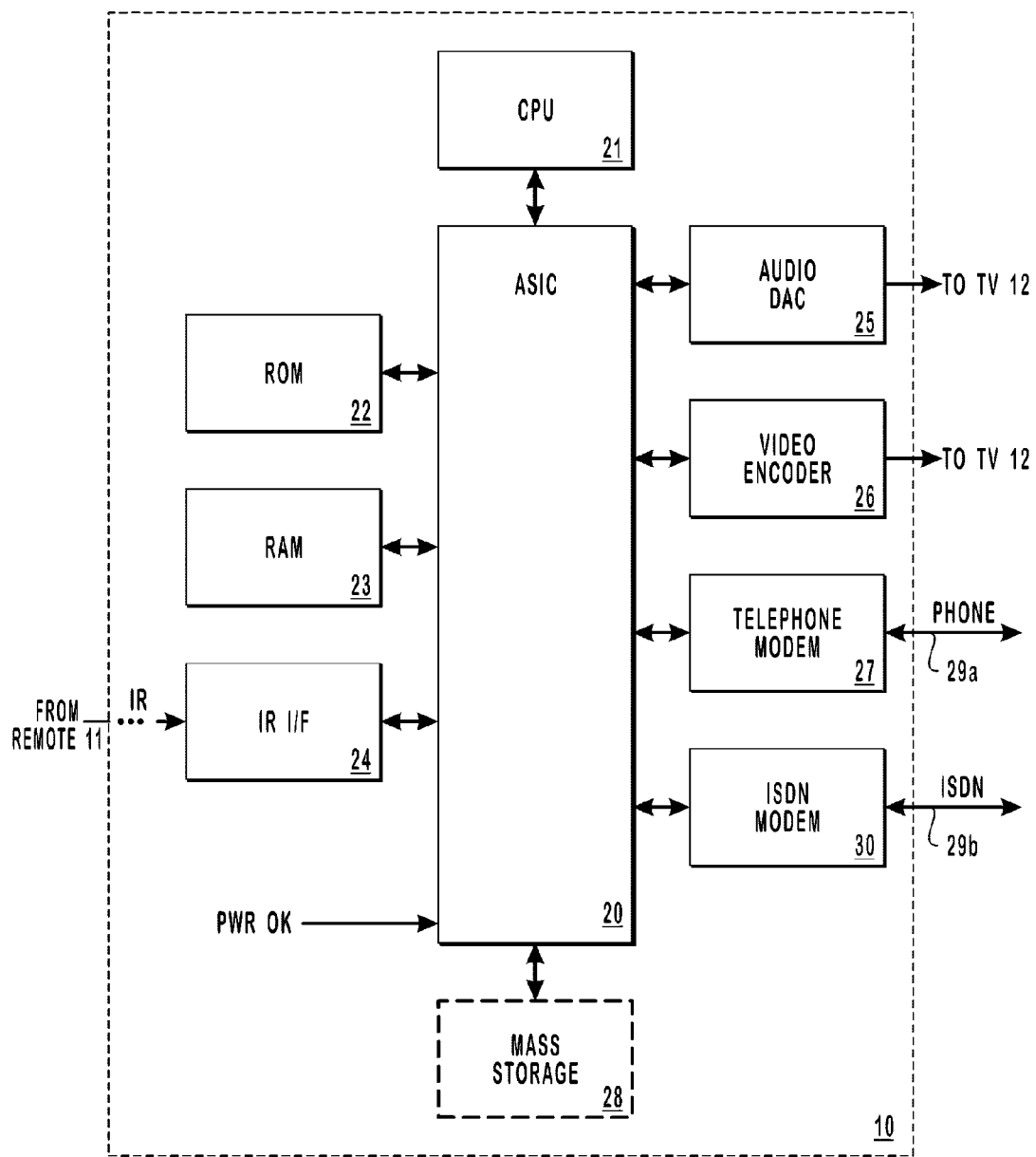
FIG. 1C is a block diagram of an electronics unit used to implement a Web browser that can be operated by remote control.

FIG. 1C is a block diagram of the internal features of the WebTV™ box 10. Operation of the WebTV™ client 1 is controlled by a central processing unit (CPU) 21, which is, coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

As mentioned above, the WebTV™ box 10 includes application software including a Web browser. Referring now to FIG. 2A, the above-mentioned application software 31 operates in conjunction with operating system (OS) software 32.

The OS software 32 includes various device drivers and otherwise provides an interface between the application software 31 and the system hardware components 40 (i.e., the elements illustrated in FIG. 1C).

In the preferred embodiment, the application software 31 and OS software 32 are stored in ROM 22. It will be recognized, however, that either or both of application software 31 and OS software 32 can be stored on any suitable storage medium, including magnetic or optical storage devices.

The Web browser functions of the present invention are implemented by application software 31. FIG. 2B illustrates the functional relationships between the various components of application software 31. Application software 31 includes a communications manager 50, an HTML (Hypertext Markup Language) parser 51, a graphics engine 52, a layout engine 53, an input system 54, a user interface 56, a selection handler 55, and a streams manager 57. The client system receives Web pages over network connection 29 in the form of HTML documents. Streams manager 57 controls and coordinates movement of data throughout the system.

Each HTML document is initially input to communications manager 50. Communications manager 50 performs functions necessary to receive an HTML document, over the network connection 29 including handling high-level communications protocols, such as HTTP (Hypertext Transport Protocol), TCP/IP (Transmission Control Protocol/Internet Protocol), etc. A received HTML document is provided by communications manager 50 to HTML parser 51. HTML parser 51 converts HTML page descriptions to a displayable format for the client system.

As is well known, an HTML document may contain text and/or refer to images. Further, an HTML document may include one or more "hypertext anchors," which are displayable objects that provide a link to another Web page. Hypertext anchors are also sometimes referred to as "hot links" or "hot spots." Each hypertext anchor is associated with a particular URL (Uniform Resource Locator) or other logical address representing the location of the Web page to which the anchor provides a link. The URL may or may not be stored within the client system, as will be discussed below. A hypertext anchor may be a word or a phrase of text, an image, or a part of an image. The hypertext anchors and other objects which are to be displayed on a screen are defined in the HTML document by a number of "tags" which specify information relating to the displayable object and its attributes (e.g., whether the object is a hypertext anchor, an image map, an image map containing hypertext anchors, etc.). Accordingly, HTML parser 51 separates tags from text within each HTML document under the control of the streams manager 57.

HTML parser 51 also generates a list of "displayables" (displayable objects) from the received HTML document. In addition, the HTML parser 51 generates a sorted list of "selectables" (selectable objects, i.e., displayable objects which are hypertext anchors). The method of generating this sorted list is discussed below in greater detail. The data structure containing the list of displayables is provided by HTML parser 51 to layout engine 53, which places the displayable objects on the screen of the television set 12. Image information, such as JPEG or GIF image information, are provided by HTML parser 51 to layout engine 53 via a graphics engine 52, which is responsible for measuring and drawing images.

In the course of browsing through a displayed Web page or between different Web pages, a user activates buttons on remote control 11, which, in response, transmits IR signals that are received by the WebTV™ box 10. Input system 54 records these inputs and provides them to selection handler 55 and user interface 56. In addition, input system 54 can handle input queuing and processing of inputs from various other input devices, such as a standard or IR keyboard. Selection handler 55 receives commands provided by the user for moving a selection (of a hypertext anchor) around on the screen (i.e., moving a selection from one hypertext anchor to another). The selection handler 55 determines, in response to the user inputs, which of the hypertext anchors in a Web page should be a current selection and provides a selection indication to the user of the current selection through the display of television set 12. Other aspects of the Web browser which are visible to the user are provided by user interface 56 based on signals received from input system 54.

2. Remote Control

Figure 3:
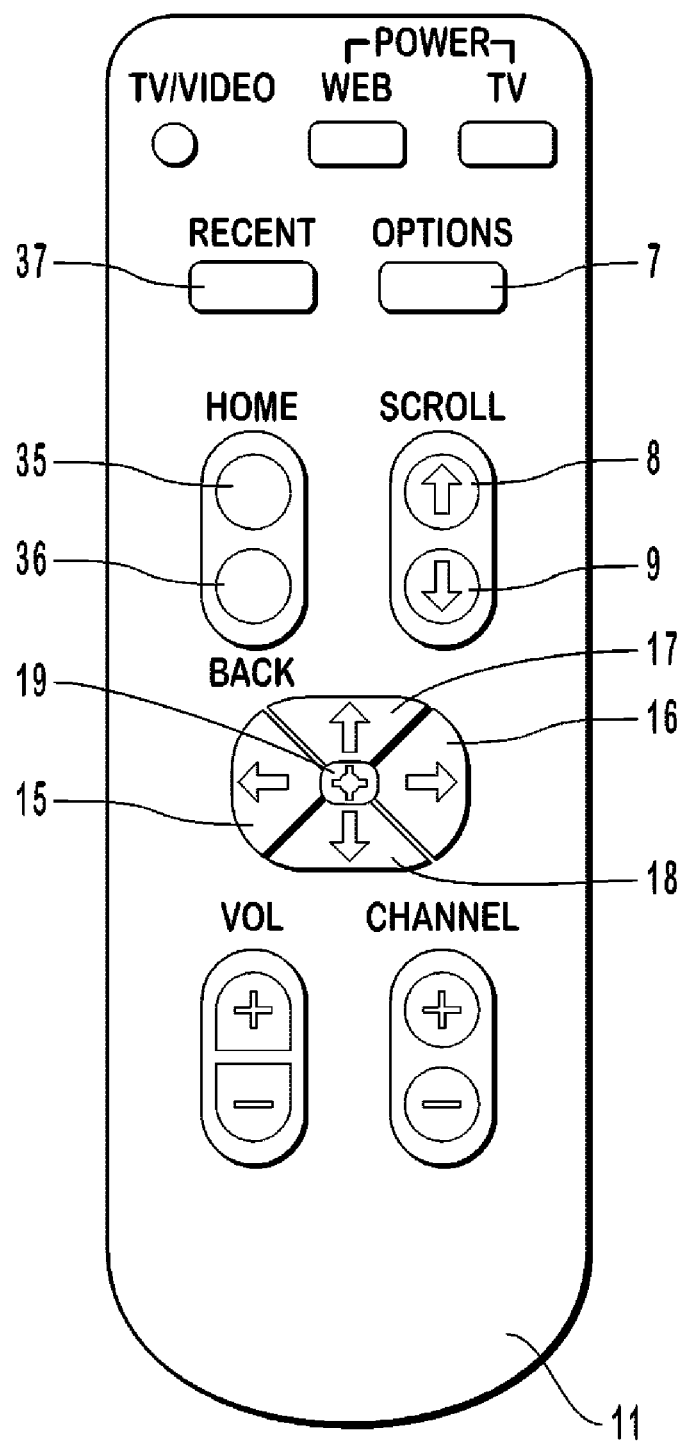
FIG. 3 illustrates a remote control for controlling the Web browser.

FIG. 3 illustrates remote control 11 in greater detail. In the preferred embodiment, remote control 11 is similar to and has the general appearance of a common, hand-held remote control that is used to control a television set. In fact, remote control 11 may include controls for performing any or all of the user-controlled functions of television set 12. In an alternative embodiment, remote control 11 may be a wired handheld controller or a wired or wireless (e.g., IR) keyboard or any other similar device. Remote control 11 includes Options button 7, Scroll Up button 8, Scroll Down button 9, direction buttons 15-18, Enter button 19, Home button 35, Back button 36, and Recent button 37. Direction buttons 15-18 include left button 15, right button 16, up button 17, and down button 18.

The functions of the controls on remote control 11 will be described below in detail. However, a summary of certain ones of these functions is helpful at this point. Home button 35 causes the WebTV™ box 10 to directly access and display the Home page of the WebTV™ network services. Back button 3 allows the user to retrace his steps by revisiting previously-visited Web pages in reverse chronological order. Recent button 37 is used to access a display indicating the most recent Web sites (pages) the user has visited. From this display, the user will be allowed to directly revisit any of those sites. Scroll Up button 8 and Scroll Down button 9 are used to scroll the screen up or down, respectively, to display a previously undisplayed portion of a Web page. Direction buttons 15-18 allow the user to specify a direction of movement in order to select a new hypertext anchor. When Enter button 19 is pressed, remote control 11 sends a command to the WebTV™ box 10 to activate the hypertext link corresponding to the currently selected hypertext anchor. That is, in response to Enter button 19 being pressed, the uniform resource locator (URL) or other logical address of the currently selected hypertext object is transmitted by the WebTV™ box 10 over the network connection 29 (except in the case of certain image maps, as will be described below) in order to access the corresponding Web page.

3. Hotlink Navigation

Figure 4A:
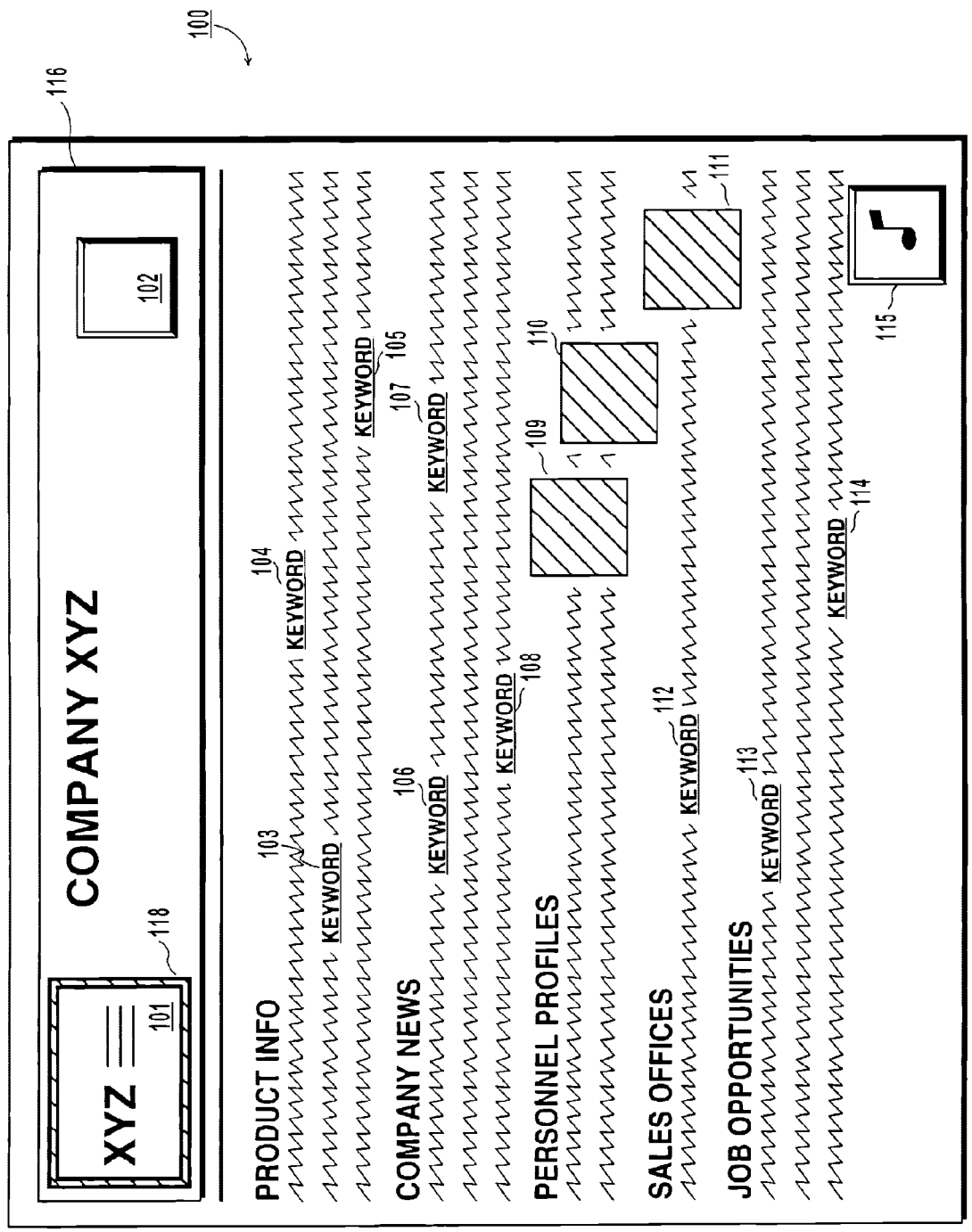
FIGS. 4A and 4B illustrate a displayed page of information containing a number of hypertext anchors.

FIG. 4A illustrates an example of a Web page 100 which may be displayed by television 12 using the client system. Web page 100 is a sample home page for a fictitious company, Company XYZ. Web page 100 includes a number of hypertext anchors 101-115, each of which provides a link to another Web page that is not currently displayed. In Web page 100, hypertext anchors 101, 102, 109, 110, 111, and 115 are image maps. Hypertext anchors 101 and 102 are included within image map 116, which is not a hypertext anchor. Hypertext anchor 101 is the logo for Company XYZ. Logo anchor 101 may provide a link, for example, to another Web page which provides a history of company XYZ. Hypertext anchor 115 may provide a link, for example, to an audio stream which generates the jingle (theme song) of Company XYZ, and which can be output to the user through the speaker of television 12. The remainder of the Web page 100 contains informational text about Company XYZ grouped under the headings: "Product Information," "Company News," "Personnel Profiles," "Sales Offices," and "Job Opportunities." Hypertext anchors 103-108 and 112-114 are key words or phrases within the text.

The application software 31 provides a means for the user to navigate between the hypertext anchors displayed on a Web page, such as Web page 100, using the remote control 11. In particular, application software 31, in response to user inputs from remote control 11, moves a selection from one hypertext object to another in a discrete movement. At a given point in time, only one displayed hypertext object is selected and is displayed as a current selection. In FIG. 4A, for example, hypertext anchor 101 is selected and is indicated as the current selection by highlighting 118. Once a hypertext anchor is selected, the user can activate its link to another Web page by pressing "Enter" button 19. To change the current selection, the user specifies a direction in which he wishes to "move" the selection by pressing any of direction buttons 15-18 on remote control 11. In response to one of these inputs, the application software 31 determines which of the other hypertext objects in the HTML document, if any, to select and display as the new current selection. In prior systems, the user is required to move a pixel-accurate cursor over the screen in continuous movements and to determine when the cursor coincides with a hypertext anchor. In contrast, the present invention determines the location of all hypertext objects and selects a new hypertext anchor based on the inputs received from remote control 11. The user is not required to locate hypertext objects.

Figure 4B:
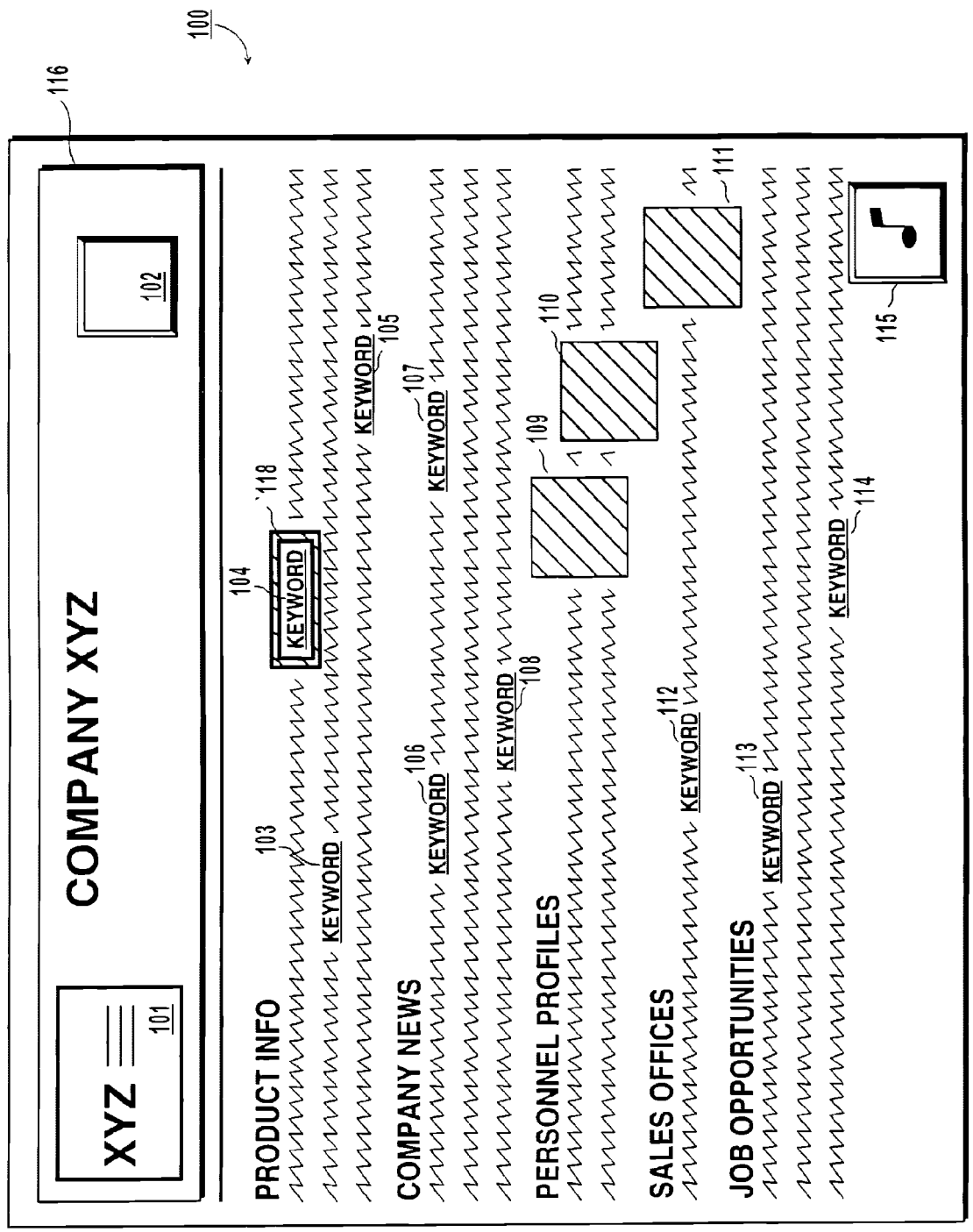

Assume now that the user wishes to change the current selection, hypertext anchor 101, to a new hypertext anchor—anchor 104, for example. The present invention allows the user to do this by pressing one of direction buttons 15-19 on remote control 11. FIG. 4B illustrates the Web page 100 as displayed with the anchor 104 as the current selection, as indicated by highlighting 118. Using remote control 11, the user may move the current selection successively through all of the displayed hypertext anchors and may also access and select hypertext anchors in the current HTML document which are not currently displayed by scrolling the document.

Figure 5:
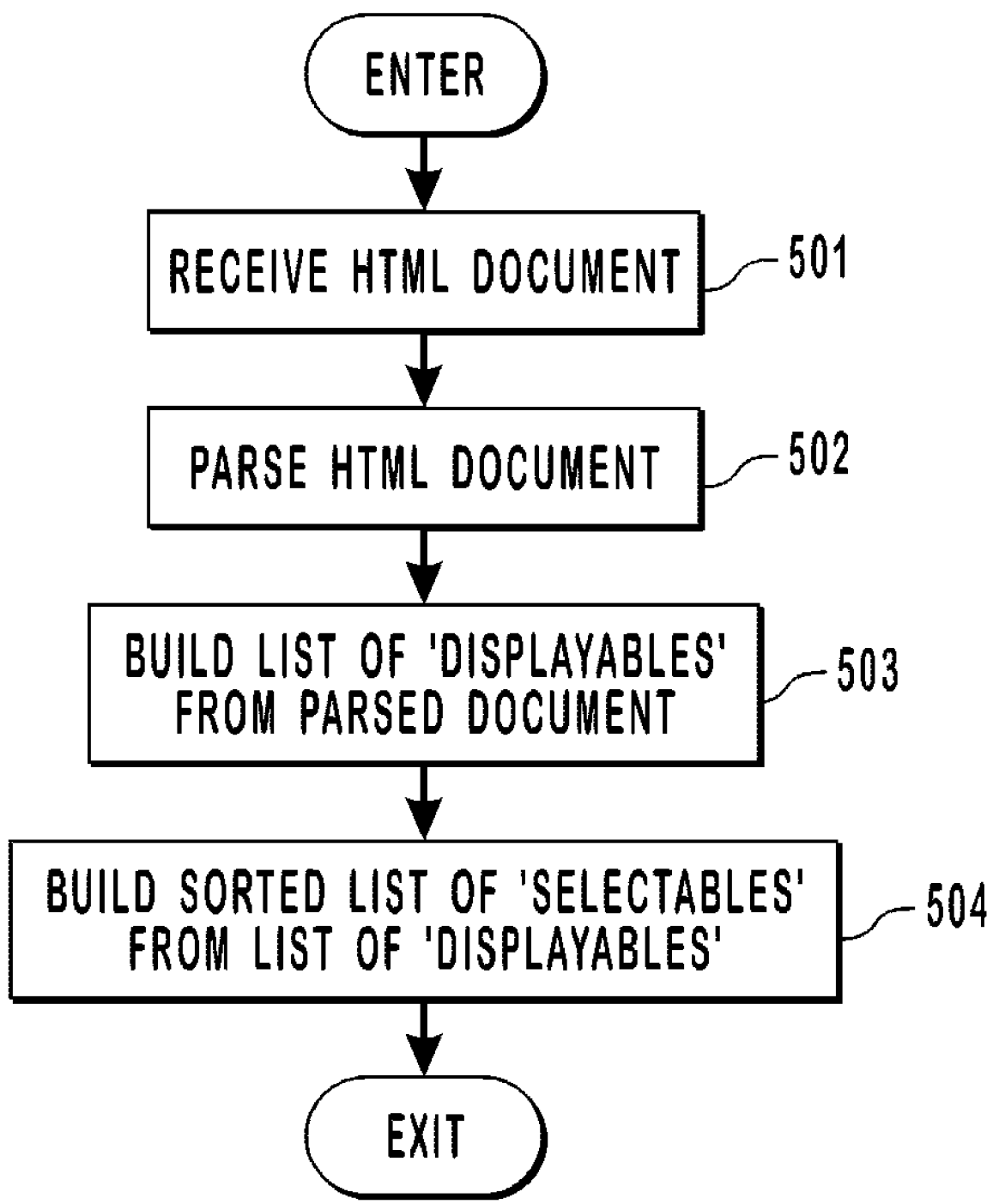
FIG. 5 is a flow diagram illustrating a procedure for receiving and processing of an HTML document according to the present invention.

FIG. 5 illustrates a process of setting up a data structure performed by the application software 31 in order to permit the functions just described. Initially, an HTML document is received via the network connection 29 (step 501). Next, the HTML document is parsed into text and tags (step 502). From the parsed HTML document, a list is generated of the displayables in the current HTML document (step 503). Displayables may include either text or images. Methods of identifying displayables in an HTML document are well known and need not be discussed herein. From the list of displayables, a sorted list of selectables (e.g., hypertext anchors) is generated (step 504).

The list of selectables is sorted as it is generated according to an insertion sort routine. The selectables are sorted according to their positioning on the Web page, as it is to be displayed. More specifically, the list of selectables is formed according to the direction of reading or writing in the English language (i.e., left to right, top to bottom). Sorting is performed first according to vertical position, and then according to horizontal position. Accordingly, a selectable would be inserted into the selectable list at a position before any selectables which it appears higher than on the Web page; a selectable would also be inserted into the selectable list at a position before any selectables that it appears to the left of on the Web page but have the same vertical position.

In performing the insertion sort to generate the list of selectables, the determination of vertical positioning requires a determination of whether a given selectable falls "above" or "below" an existing entry in a selectable list. This determination can be complicated by the fact that there is often overlap in the vertical direction between two selectables. In FIGS. 4A and 4B, for example, there is vertical overlap between anchors 109 and 110. The present invention resolves this difficulty in the following way: If there is overlap between a given selectable and another selectable, then the given selectable is considered to be "below" the other selectable if the overlap between the two selectables is less than one-half of the height of the smaller of the two selectables and the top of the given selectable is below the top of the other selectable. If the overlap is not less than one-half of the height of the smaller of the two selectables or if the top of the given selectable is not below the top of the other selectable, then the given selectable is not considered to be "below" the other selectable. This same criterion is applied to determine when a given selectable can be considered "above" another selectable. Further, this method of defining the conditions "above" and "below" is also used in moving the current selection in response to a user input, as will be discussed below.

Referring now to FIGS. 4A and 4B for example, the sorted list of selectables generated from Web page 100 would have the following order (listed by reference numeral): 101, 102, 104, 103, 105, 106, 107, 108, 109, 110, 112, 111, 113, 114, 115. It should be appreciated that in the actual implementation, the sorted list of selectables may actually constitute a list of pointers to entries in the list of displayables. Note that in reading Web page 100 from top to bottom (in English), a person would encounter anchor 104 before encountering anchor 103, since anchor 104 is in a line of text that is above the line of text including anchor 103. Consequently, anchor 104 appears before anchor 103 in the sorted list of selectables. Note further that anchor 112 appears before anchor 111 in the sorted list of selectables; this is so because there is overlap in the vertical direction between these two anchors, and the amount of overlap includes the entire height of anchor 112. Consequently, anchors 111 and 112 are considered to have the same vertical rank on Web page 100. However, since anchor 112 appears to the left of anchor 111, anchor 112 is inserted into the sorted list before anchor 111.

Figure 6:
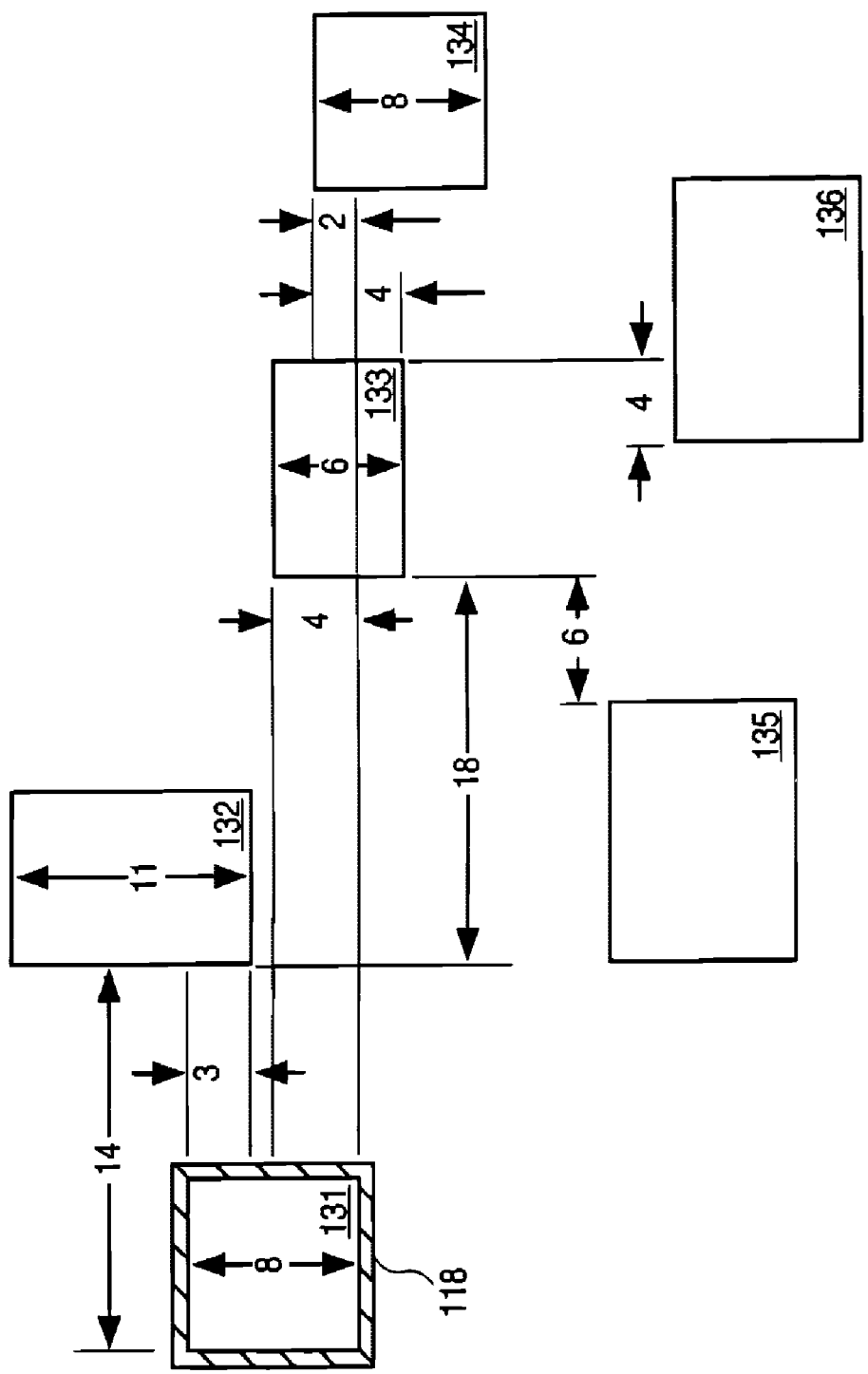
FIG. 6 illustrates several hypertext anchors as displayed on a display device.
Figure 7A:
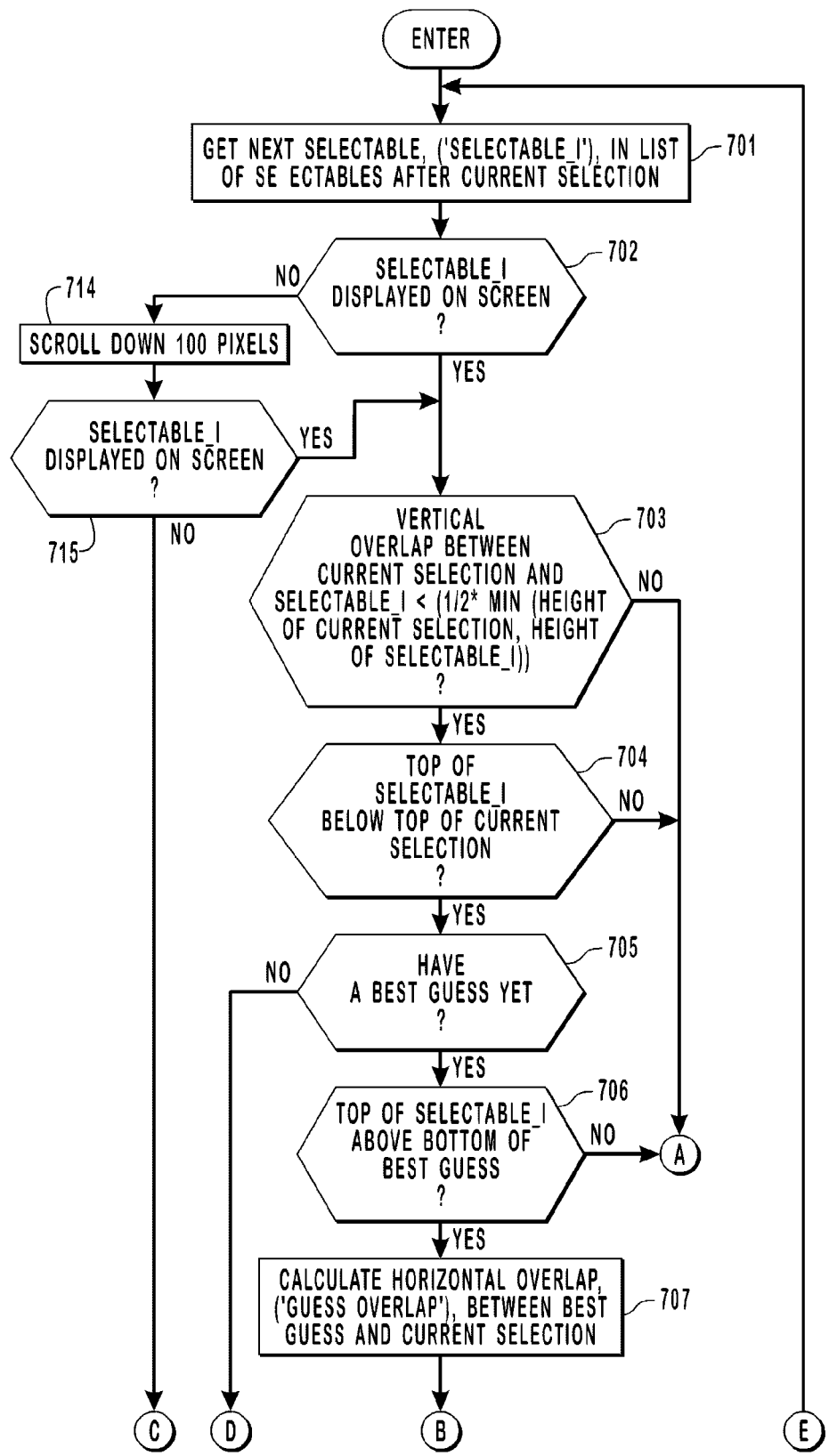
FIGS. 7A and 7B are a flow diagram illustrating the procedure of movement of a selection between two hypertext anchors in the downward direction using the remote control of FIG. 3.
Figure 7B:
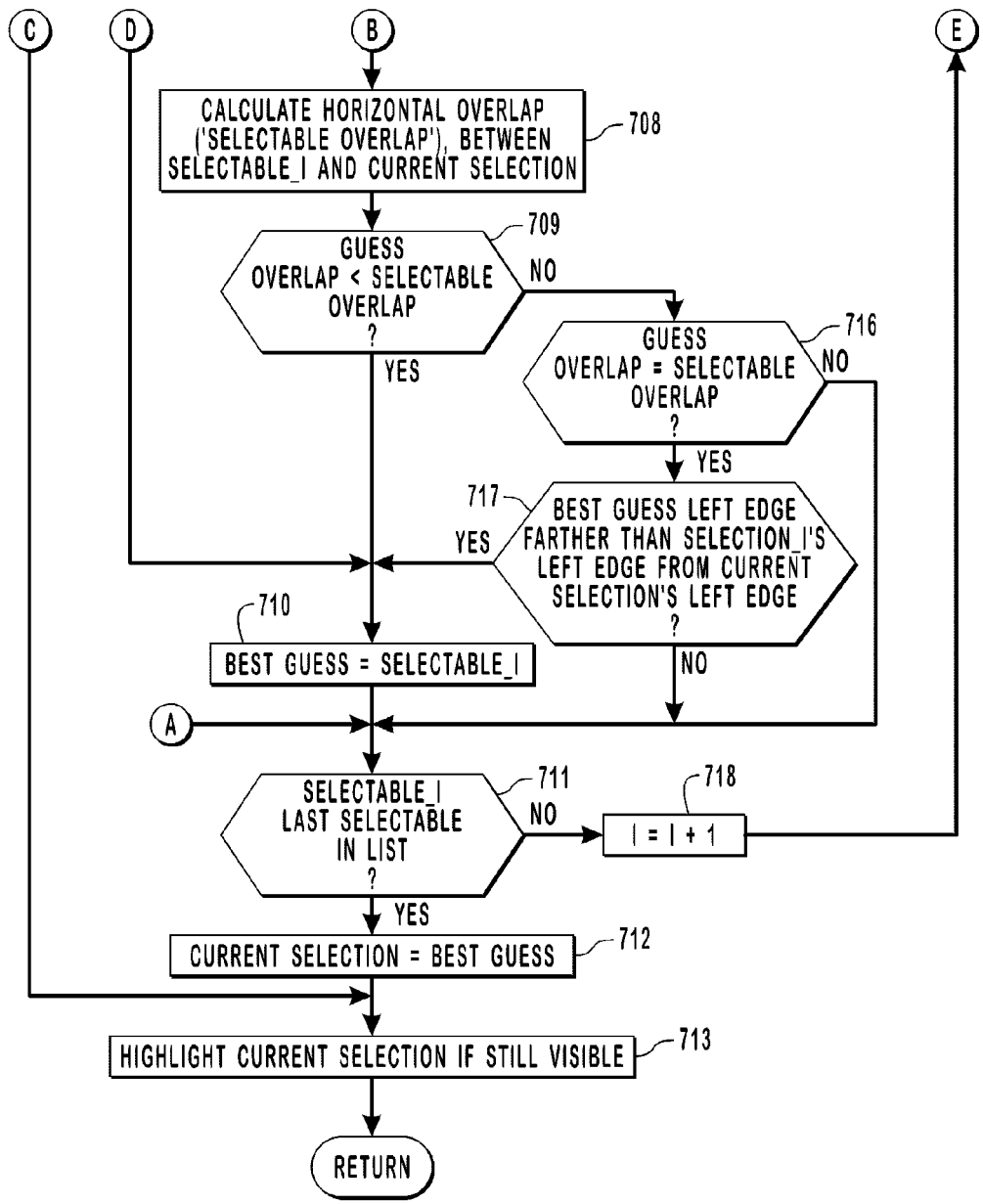

The method of moving a selection between hypertext anchors using remote control 11 will now be described with reference to FIGS. 6, 7A, and 7B. As mentioned above, a user may move the current selection left or right by one hypertext anchor by pressing left button 15 or right button 16, respectively. In response to receiving an IR signal corresponding to either button 15 or button 16, the software 31 of the present invention (specifically, selection handler 55) simply moves one position through the sorted list to determine the new current selection. That is, if left button 15 was pressed, the new current selection will be one position higher in the sorted list from the current selection, whereas, if right button 16 was pressed, the new current selection will be one position lower in the sorted list from the current selection. In response to any of direction buttons 15-18 being pressed, a new current selection will be determined and the highlighting 118 will be moved to indicate the new current selection. The screen may be scrolled to display the current selection, as discussed below. As mentioned above, the user may activate the hypertext link of the current selection by pressing "Enter" button 19.

Movement of the current selection in response to down button 18 being pressed will now be described with reference to FIG. 7A. When down button 18 is pressed, each entry (selectable) that appears in the sorted list after the current selection is examined according to the following routine to determine whether it is a Best Guess. The Best Guess is a selectable which is, at least temporarily, considered to be the most likely selectable to be the new current selection based on the last user input. As each entry in the list is tested, whichever entry is currently considered to be the Best Guess may then be replaced by the selectable being tested if the selectable being tested is determined to be a better choice. Once the end of the list is reached, the selectable that is designated as the Best Guess will be taken to be the new current selection. Accordingly, highlighting 118 will be moved to indicate the new current selection to the user.

In response to the down button 18 being pressed, the application software 31 initially determines which selectable in the sorted list of selectables is the next selectable after the current selectable (i.e., after the current selection) (step 701); the result of this determination will be referred to herein as "selectable_I". Next, the determination is made of whether selectable_I is currently displayed on the screen (step 702). If not, then the screen is scrolled down by a predetermined number of pixels, but less than an entire screen (step 714). An exemplary number of pixels is 100, although that number is essentially arbitrary. After the screen is scrolled down by the predetermined number of pixels, another determination is made of whether selectable_I is displayed on the screen (step 715). If the selectable_I is still not displayed on the screen, then the current selection is not changed, and the highlighting 118 is not moved (step 713). Note that if the current selection is no longer visible after the scroll, no selection is displayed.

If, however, after scrolling down by the predetermined number of pixels (step 714), selectable_I is displayed on screen, or if selectable_I was displayed initially (step 702), then a determination is next made of whether the vertical overlap between the current selection and selectable_I is less than one-half of the height of the smaller of the current selection and selectable_I (step 703). If so, a determination is made of whether the top of selectable_I is below the top of the current selection (step 704). Note that the order of these two determinations (steps 703 and 704) can be reversed, if desired. Note also that these two determinations constitute the same test used to determine the "below" condition when generating the sorted list of selectables.

If the answer to either of these two determinations is "no," then the process proceeds to a determination of whether selectable_I is the last selectable in the sorted list (step 711). If selectable_I is not the last selectable in the list, then the procedure of FIGS. 7A and 7B is repeated, taking the next selectable in the list as selectable_I (steps 718, 701). Alternatively, if selectable_I is the last selectable in the list, then the new current selection is taken to be whichever selectable is currently designated as the Best Guess, as explained below (step 712).

If (in step 703) the vertical overlap between the current selection and selectable_I is less than one-half of the height of the smaller of the current selection and selectable_I, and (in step 704) the top of selectable_I is below the top of the current selection (step 704), then it is next determined whether there is currently a Best Guess (step 705). If there is not yet a Best Guess, then the Best Guess is taken to be selectable_I (step 710). Again, if selectable_I is not the last selectable in the list, then the process repeats from the beginning with the next entry in the list. If (in step 705) there was already a Best Guess, then a determination is made of whether the top edge of selectable_I has a higher vertical position (smaller "Y" coordinate) than the bottom edge of the Best Guess selectable (step 706). If not, then selectable_I is disregarded as a potential new Best Guess, since it is lower on the screen than the current Best Guess. The reason for disregarding selectable_I in this case is an assumption that the user would not wish to jump from the current selection to selectable_I if there is another selectable that is below the current selection but above selectable_I. Accordingly, in that situation a determination is again made as to whether selectable_I is the last selectable in the list (step 711). If not, the process repeats from the beginning (steps 718, 701) using the next entry in the list.

If (in step 706) the top of selectable_I is higher than the bottom of the Best Guess, then it is determined how much overlap, Guess Overlap, exists (if any) between the Best Guess and the current selection (step 707) in the horizontal direction. Similarly, a determination is made of how much horizontal overlap, Selectable Overlap, exists (if any) between selectable_I and the current selection (step 708). If Guess Overlap is less than Selectable Overlap (step 709), then the Best Guess is replaced by selectable_I (step 710); that is, selectable_I is then considered to be the new Best Guess. Accordingly, the process repeats using the next entry in the sorted list of selectables, assuming selectable_I was not the last selectable on the list.

If (in step 709) Guess Overlap is not less than Selectable Overlap, then two situations might exist. The first situation is that the overlap amounts are equal (i.e., Guess Overlap=Selectable Overlap). The second is that Selectable Overlap is greater than Guess Overlap. Generally, the amount of horizontal overlap will be equal when Guess Overlap and Selectable Overlap are both zero (i.e., when neither selectable_I nor the Best Guess overlaps the current selection horizontally). If Guess Overlap and Selectable Overlap are equal, then selectable_I is taken to be the new Best Guess (in step 710) only if the left edge of the Best Guess is farther from the left edge of the current selection than the left edge of selectable_I is from the left edge of the current selection (step 717). Otherwise, the process repeats using the next selectable in the list.

If Guess Overlap is not less than Selectable Overlap and either: (1) the Guess Overlap does not equal Selectable Overlap, or (2) the left edge of Best Guess is closer to the left edge of the current selection than the left edge of selectable_I is to the left edge of the current selection (steps 716 and 717), then the Best Guess is retained, and the process repeats (unless selectable_I was the last selectable in the list).

Once the last selectable in the list has been tested using the process just described, then the new current selection is taken to be whichever selectable is currently the Best Guess (step 712). The new current selection is then highlighted (step 713).

The procedure of FIG. 7A will now be explained with reference to FIG. 6. FIG. 6 shows a number of hypertext anchors 131-136 and defines certain spatial relationships between those anchors. A sorted selectable list of the anchors in FIG. 6 would have the following order: 132, 131, 133, 134, 135, 136. Assume now that the current selection is anchor 131 as indicated by highlighting 118. Assume further that the user has just entered an input by pressing the down button 18 on remote control 11. In response, the application software 31 initiates the process of examining entries in the sorted selectable list that follow selectable 131 (i.e., beginning with selectable 133). Note that selectable 132 appears before 131 in the sorted list because it is "above" selectable 131 (according to the criteria described above) and is therefore not considered in response to the down button 18 being pressed. Therefore, according to the routine of FIG. 7A, the amount of vertical overlap between selectable 133 and selectable 131, if any, is determined. In this example, the amount of overlap is four units. The dimensions illustrated in FIG. 6 are provided only for purposes of illustration and can have essentially any units, such as pixels, for example. Since the amount of vertical overlap (four units) between selectable 133 and selectable 131 is greater than one-half of the height of the smaller of these two selectables (one-half of the height of selectable 133, which is 6/2, or 3), selectable 133 is not considered to be "below" selectable 131. Consequently, since there is currently no Best Guess, selectable 133 is ignored and the next selectable in the list, selectable 134, is examined. (If there were currently a Best Guess, then that Best Guess would be retained.)

Continuing now through the sorted list of selectables, selectable 134 overlaps selectable 131 in the vertical direction by two units. Two units is less than one-half of the height of the smaller of these two selectables (which are equal in height). Further, the top edge of selectable 133 is below the top edge of selectable 131. Therefore, selectable 134 is considered to be "below" selectable 131, and selectable 134 is taken to be the new Best Guess (step 710). The next selectable to be examined is selectable 135. Selectable 135 does not overlap selectable 131 and is, therefore, considered to be below the current selection. However, the top edge of selectable 135 is below the bottom edge of the Best Guess, selectable 134. Therefore, selectable 135 is not a "better" Best Guess than the current Best Guess, selectable 134. Consequently, selectable 134 is retained as the Best Guess and the next selectable in the list, selectable 136 is examined. Essentially the same analysis applies to selectable 136 as to selectable 135. Therefore, when the end of the sorted list is reached, the Best Guess remains selectable 134. Consequently, it is determined that the new current selection is selectable 134. Accordingly, selectable 134 is highlighted to so indicate.

In a different scenario, assume now that the current selection is selectable 132 and that down button 18 is pressed. The next selectable in the sorted list of selectables after selectable 132 is selectable 131. Therefore, selectable 131 is the first selectable to be examined. Selectable 131 does not overlap selectable 132 by more than four units (½ the height of selectable 131). Further, the top edge of selectable 131 is below the top edge of selectable 132. Therefore, selectable 131 is considered to be "below" selectable 132 and is taken to be the Best Guess. Moving through the sorted list, the next selectable to be examined is selectable 133. Selectable 133 meets the conditions for being "below" the current selection, selectable 132. Moreover, the top edge of selectable of 133 is not below the bottom edge of the current Best Guess, selectable 131. Therefore, selectable 133 is, so far, not eliminated from consideration. Instead, the amount of horizontal overlap is determined between selectable 133 and the current selection selectable 132 and between selectable 131 and the current selection. In this case, both selectable 131 and selectable 133 have no horizontal overlap with the current selection, selectable 132. Therefore, the next step is to determine (step 717) whether the left edge of the current selection is closer to the left edge of selectable 131 or to the left edge of selectable 133. Here, the left edge of 131 is closer. Therefore, selectable 131 is retained as the Best Guess (step 710). The above process then continues by examining the next selectable in the sorted list, selectable 134, and so forth, until the end of the sorted list is reached. At that point, the Best Guess is taken as the new current selection.

In yet another scenario, assume that the current selection is selectable 133 and that down button 18 was just pressed. Selectable 134 is the first selectable in the list to be examined. The overlap between selectable 134 and 133 is greater than one-half the height of the smaller of these two selectables (i.e., greater than 6/2, or 3). Therefore, selectable 134 is eliminated from consideration. At this point there is no Best Guess. Selectable 135 is considered next. Selectable 135 does not vertically overlap the current selection, selectable 133, and the top of selectable 135 is below the top of the current selection. Therefore, selectable 135 is taken to be the Best Guess. Next, selectable 136 is considered. Selectable 136 does not overlap the current selection, nor is the top edge of the selectable 136 below the bottom edge of selectable 135. Therefore, the horizontal overlap between the Best Guess and the current selection (Guess Overlap), and between selectable 136 and the current selection (Selectable Overlap), are determined. The Guess Overlap is zero. However, Selectable Overlap is four units. Therefore, because Selectable Overlap is greater than Guess Overlap, selectable 136 is taken to be the new Best Guess. Further, since selectable 136 is the last selectable in the sorted list, the new current selection is taken to be the current Best Guess, selectable 136.

Figure 7C:
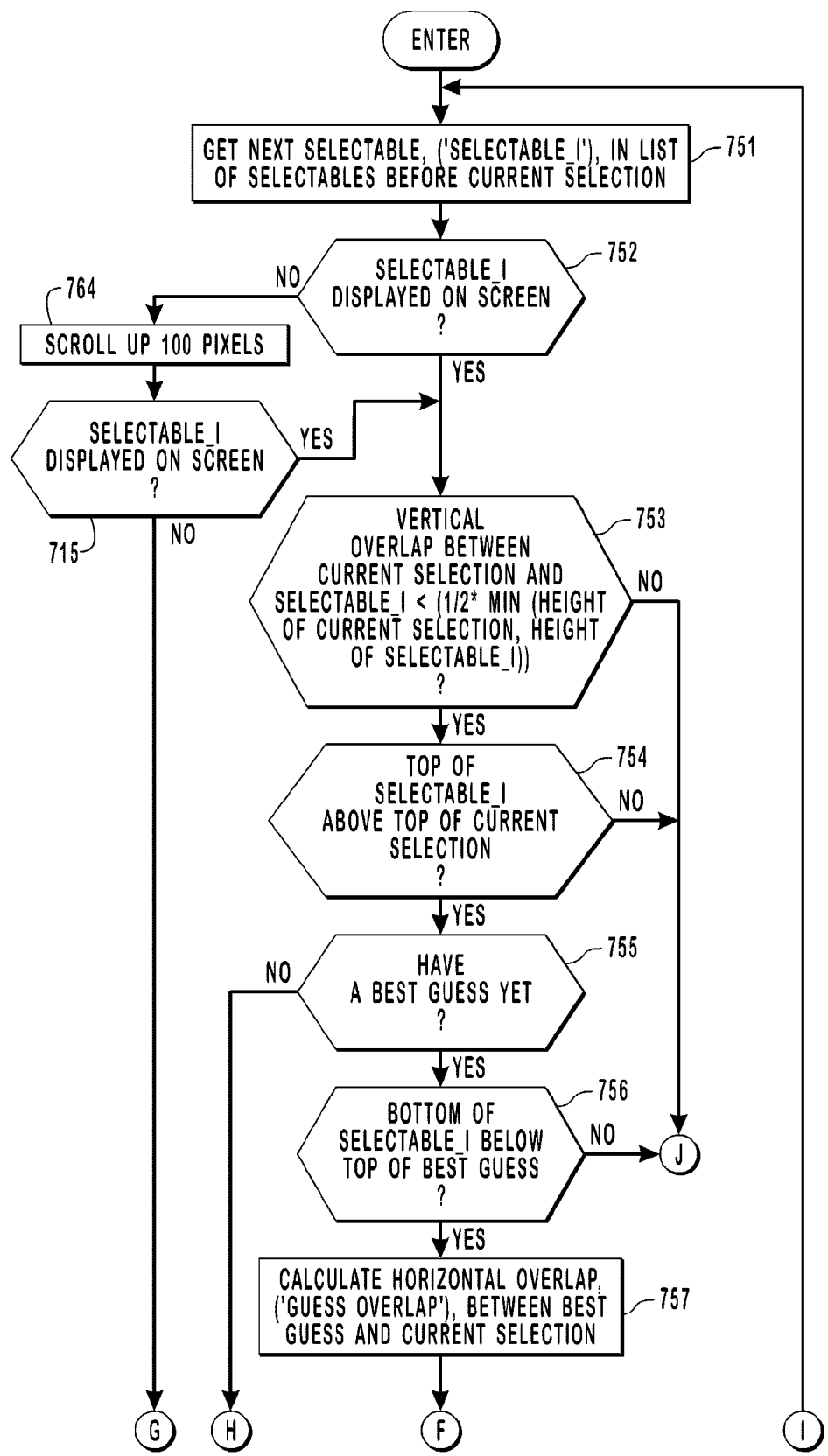
FIGS. 7C and 7D are a flow diagram illustrating the procedure of movement of a selection between two hypertext anchors in the upward direction using the remote control of FIG. 3.
Figure 7D:
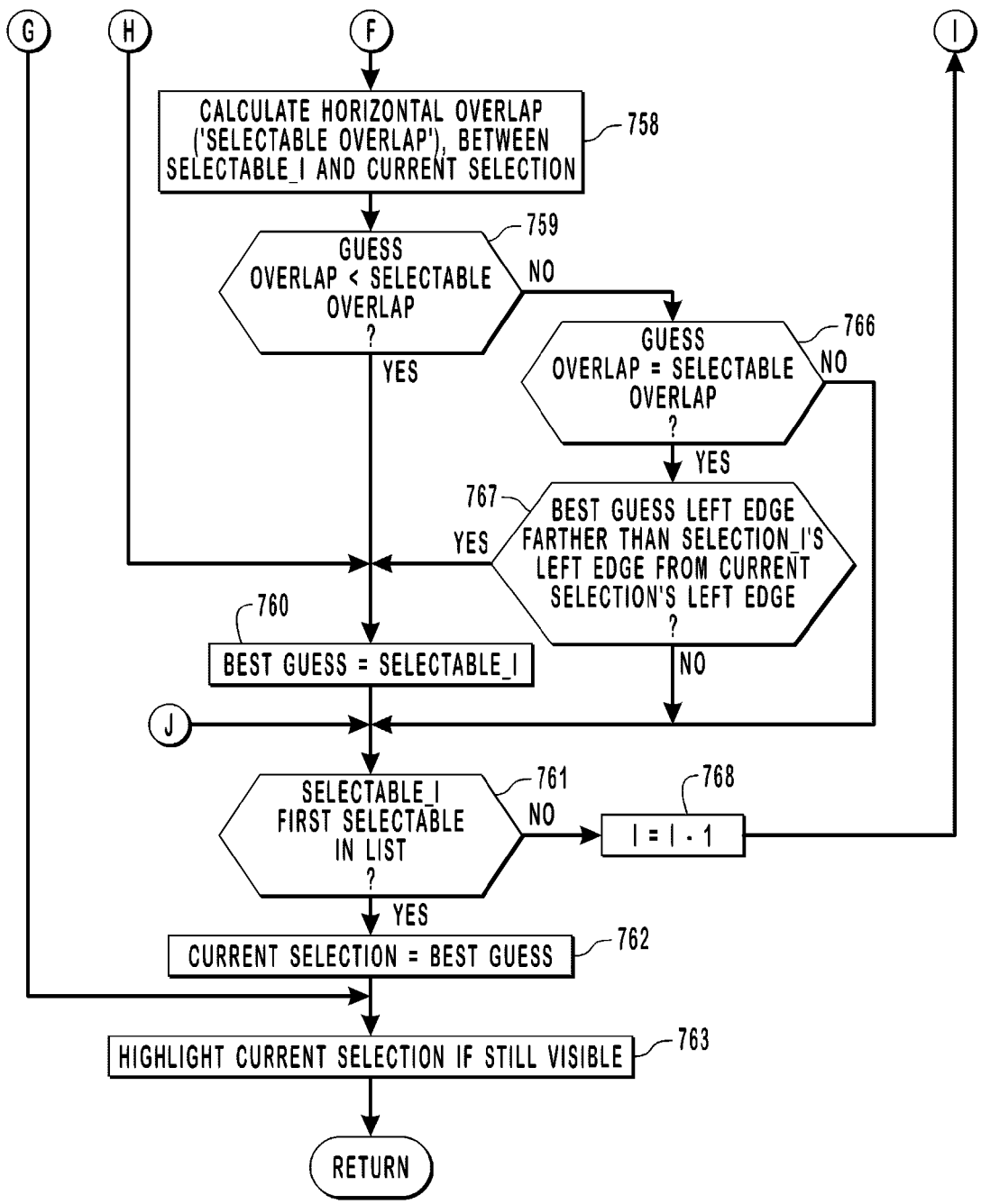

The procedure of changing the selection in response to up button 17 being pressed is illustrated in FIGS. 7C and 7D. The procedure for up button 17 is substantially identical to the procedure for down button 18 (FIGS. 7A and 7B) and therefore need be not be described on a step-by-step basis. Nonetheless, certain differences should be noted. In response to the up button 17, in contrast with the procedure for down button 18: (1) entries in the list of selectables are examined moving backward through the list (not forward) starting with the selectable immediately preceding the current selection (steps 751, 768), until all selectables in the list preceding the current selection have been examined; (2) the amount of vertical overlap is calculated in order to determine whether a selectable, selectable_I, is "above" the current selection, not "below" (step 754); (3) selectable_I is ignored as a possible new current selection if the bottom of selectable_I is above the top of the current Best Guess (step 756); and, (4) if selectable_I is not currently displayed, the screen is scrolled up (not down) by a predetermined number (e.g., 100) of pixels.

4. Image Maps

Another feature provided by application software 31 is that it can distinguish between and handle various types of image maps, such as "client-side" image maps and "server-side" image maps. A "client-side" image map is defined herein to be an image map for which the client system has a URL. The client system can therefore directly access any Web page to which a client-side image map is linked. In contrast, a "server-side" image map is defined herein to be an image map which is or includes one or more hypertext anchors, the URLs of which are not available to the client system. That is, the information for a server-side image map is stored on one or more server systems. The client system activates a link to a server-side image map by transmitting the screen coordinates corresponding to that image map to one of the server systems, which in turn accesses the URL of the corresponding hypertext object.

Referring again to FIG. 4A, Web page 100 includes image map 116. Image map 116 includes hypertext anchors 101 and 102. Assume now that image map 116 is a client-side image map. Therefore, in moving the current selection in response to user inputs, hypertext anchors 101 and 102 are treated as any other hypertext objects on Web page 100. That is, the selection can be moved back and forth between anchors 101 and 102, or between either of these anchors and any other anchor on Web page 100, using the direction buttons 15-18. Assume instead that image map 116 is a server-side image map. In that case, the HTML document received by the client system does not specify the URLs associated with hypertext anchors 101 and 102. Therefore, the entire image map 116 is treated as a single selectable for purposes of navigating between selectables.

Figure 8:
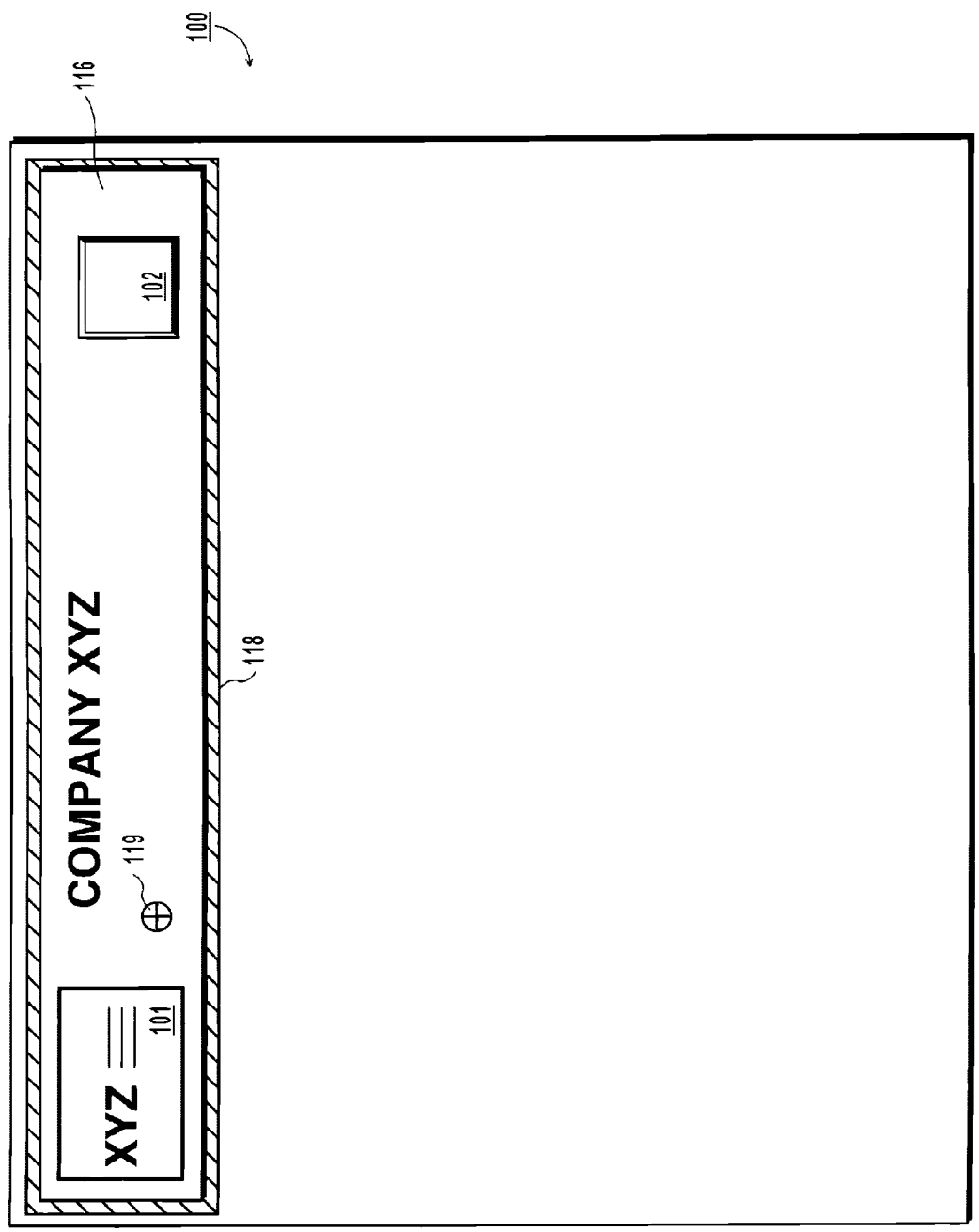
FIG. 8 illustrates a display screen displaying a server-side image map and a selection icon.

When a server-side bit map is currently selected, a selection icon, such as a cross-hairs 119, will be displayed within the boundaries of the image map, as shown in FIG. 8, in response to the user's pressing "Enter" button 19. Once the selection icon is displayed, the directional buttons 15-18 will control movement of the selection icon. Each time one of buttons 15 through 18 is pressed, the selection icon will be moved a predetermined number of pixels in the direction represented by that button. If a directional button is pressed multiple times in rapid succession, or if the user holds a directional button down, the distance which the cross-hairs 119 are moved for each press of the button will be increased over the normal distance increment. When the user presses "Enter" button 19, the coordinates of cross-hairs 119 relative to the upper left corner of the image map are transmitted by the client system over the network connection 29 to the server system which provided the HTML document and which has the URL or other address of any hypertext anchors included in the server-side image map. If the transmitted coordinates coincide with a hypertext anchor, (e.g., anchor 101 or 102 in FIG. 8), the server system then accesses the Web page at the corresponding URL or other address and transmits an HTML document defining that Web page to the client system.

Figure 9:
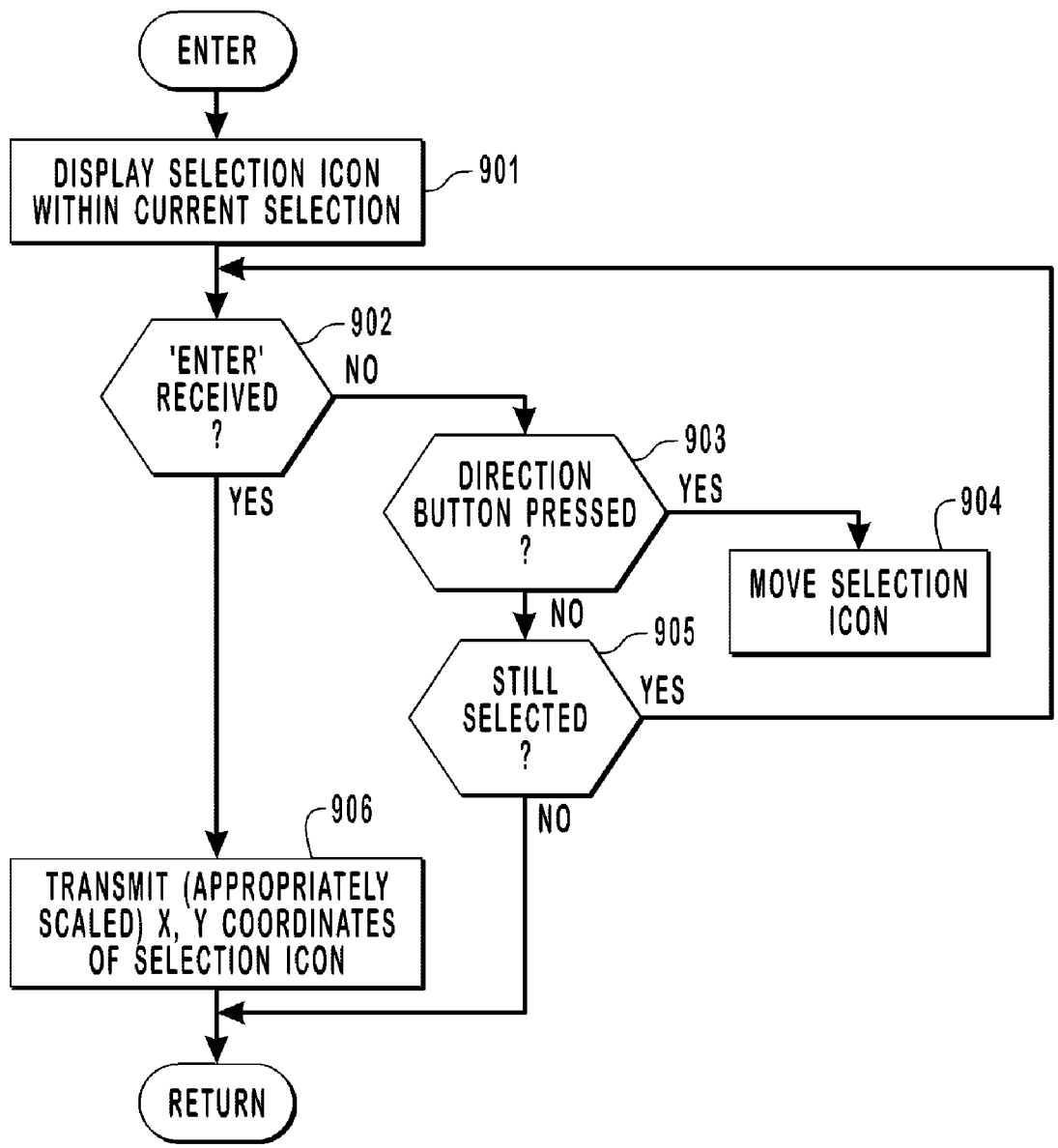
FIG. 9 is a flow diagram illustrating a procedure for selecting an image map displayed on a display device and for accessing a Web page represented by the image map.

As noted above, an image map may be or may include one or more hypertext anchors. FIG. 9 illustrates a procedure by which the present invention handles server-side image maps. Note that the determination of whether an image map is a client-side image map or a server side image map is made at layout time based on the contents of the received HTML document. The method of making such a determination is well-known. Referring to FIG. 9, when the current selection is a server-side image map, the selection icon 119 is displayed superimposed on the image map within the boundaries of the image map (step 901). Any convenient point within the image map, such as the centroid of the image map, can be taken as the point at which the selection icon is initially displayed. The system then waits for either the "Enter" command or an input entered through one of the direction buttons 15-18 to move the selection icon (steps 902 and 903), as long as the image map is selected (step 905). If an input is received from one of buttons 15-18, then the selection icon is moved accordingly (step 904). If the "Enter" command is received via button 19, then the client system transmits the X,Y coordinates of the selection icon over the network connection 29 (step 906). In response, the server system that provided the HTML document determines whether the coordinates correspond to a hypertext anchor, as described above. If so, the Web page at the corresponding address is retrieved and transmitted back to the client system over the network connection 29.

In some cases, images that are downloaded via the network connection 29 will not be appropriately sized for display on television set 12. This is because images generally will be sized for display on a computer monitor rather than on an ordinary television set. One prior art solution for dealing with Web pages larger than the display is to allow horizontal and vertical scrolling. However, it has been found that horizontal scrolling can be confusing to some people.

Because a key aspect of the present invention is to simplify the user interface for Web browsing, therefore, the present invention provides a mechanism to eliminate the need for horizontal scrolling for oversized Web pages. This mechanism is a scaling operation to reduce the image size of all Web page elements to fit within the horizontal dimension of a television-formatted display. Since it is desirable to retain uniform proportions, the scaling operation is performed on both the horizontal and vertical dimensions using the same scale factor. However, the scaling factor is based only upon the amount of scaling necessary to fit the Web page within the horizontal borders of a television display. The value of the scaling factor will depend upon the particular television format used by the client 1 (e.g., NTSC, PAL, etc.). Thus, the only user scrolling operation required by the present invention is vertical scrolling.

In one embodiment, the scaling operation is performed in the client 1 by the Web browser. In another embodiment, the scaling is performed in the server 5, which functions as a proxying server in such embodiment.

This scaling operation must be taken into account when transmitting coordinates of the selection icon within a server-side image map; otherwise, the transmitted coordinates will be inaccurate. Therefore, before the coordinates of the selection icon are transmitted across the network connection 29, the coordinates must be scaled up based on the scale factor that was used to scale the image map down.

Figure 10:
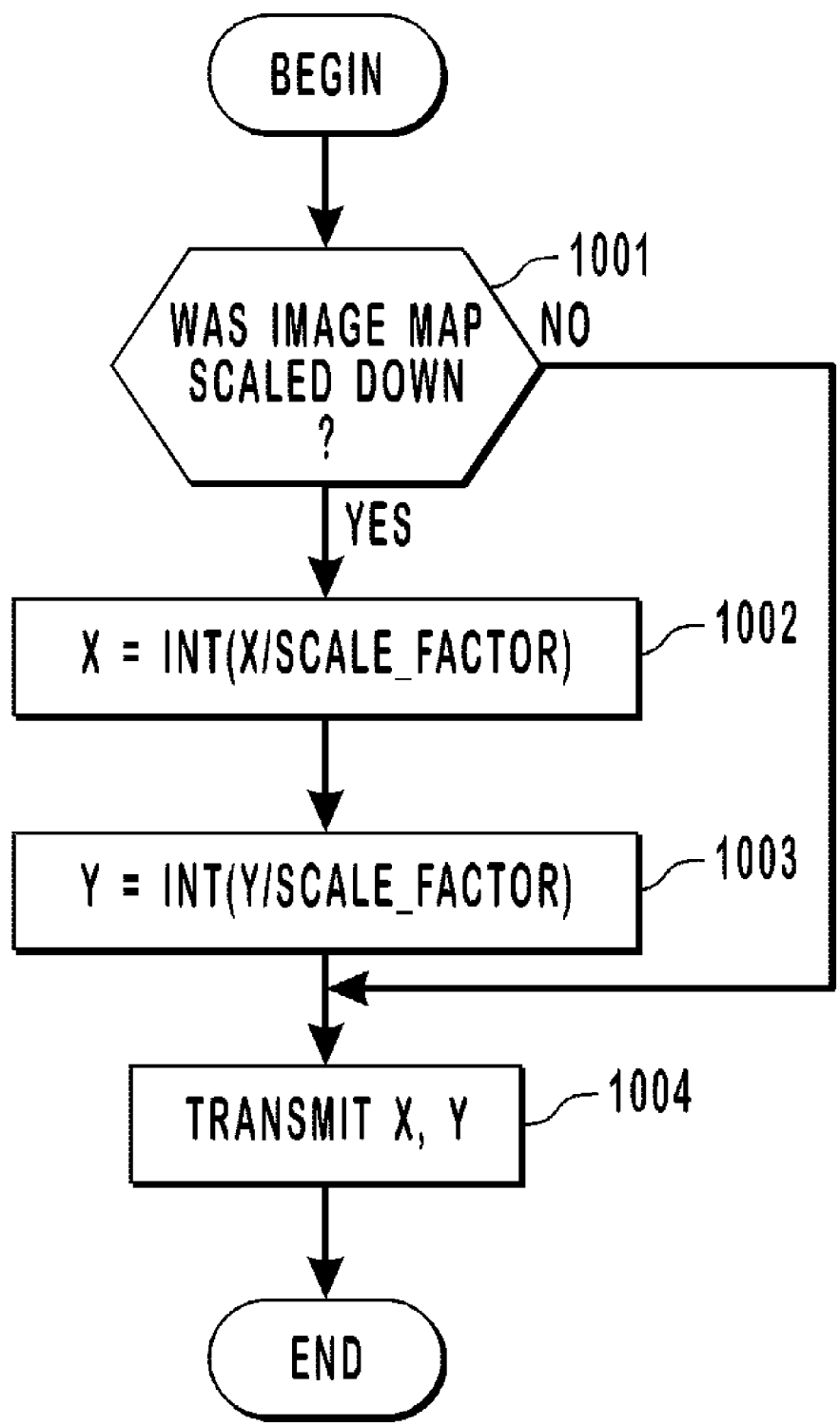
FIG. 10 is a flow diagram illustrating a process for resealing cursor coordinates in relation to a scaled-down image map.

FIG. 10 illustrates the procedure for rescaling coordinates before transmitting. Initially, it is determined whether the image map was scaled down for display on television set 12 (step 1001). If not, then the X,Y coordinates of the selection icon 119 are transmitted unchanged. If the image map was scaled down, then the new X coordinate is taken to be the old X coordinate, divided by the scale factor, and then truncated to an integer value (step 1002). The scale factor is assumed here to be between zero and one. Similarly, the new Y coordinate is taken to be the old Y coordinate divided by the scale factor, and then truncated to an integer value (step 1003). The new X and Y coordinates are then transmitted over the network connection 29 (step 1004) to the server system.

5. Web Page by Address

Figure 11:
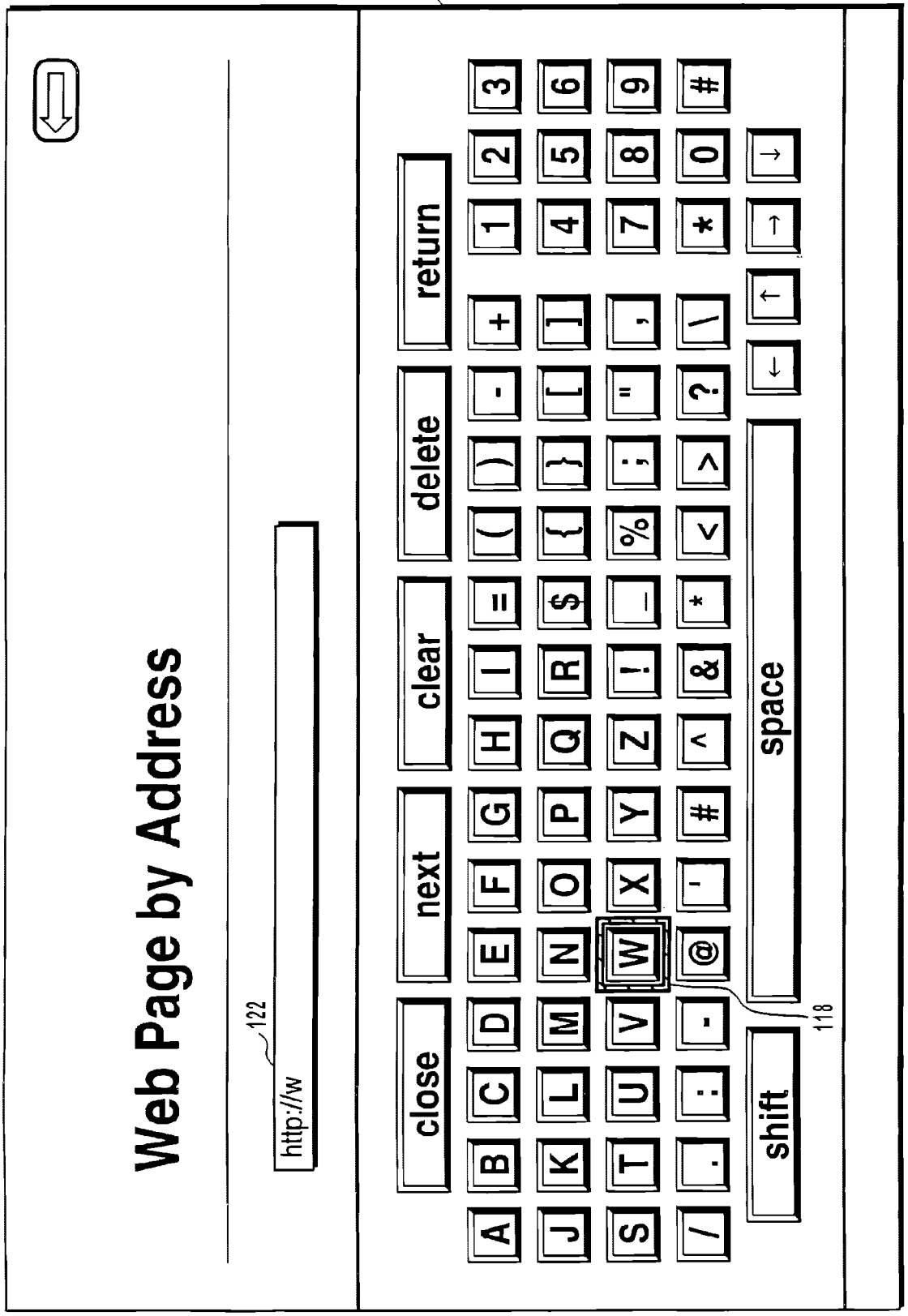
FIG. 11 illustrates an image of an alphanumeric keyboard as displayed on a display device by the application software of the present invention.

The application software 31 also provides a means by which the user can access a given Web page directly when the user knows the URL of that Web page. Using remote control 11, the user accesses this feature by pressing an appropriate button, such as Option button 7, to access a menu and then selecting the appropriate menu item. Upon receiving this input via the IR interface, software 31 would display a screen on television set 12 as shown in FIG. 11. The display screen includes an image map including a representation of an alphanumeric keyboard. Each key in the keyboard image is represented as a distinct object in software 31 and functions as a "soft button"; that is, each key can be selected and used to enter the letter it represents using the remote control 11. Control of the selection indicator 118 between the various soft buttons in the alpha numeric keyboard image is performed in essentially the same manner used to control movement between the hypertext anchors as described above.

When the keyboard image 120 is initially displayed, one of the keys is highlighted, such as the "A" key. The user may then use the directional buttons 15-18 on remote control 11 to move the selection on the screen. The user enters any given letter by selecting that letter and then pressing "Enter" button 19. This causes the selected letter to be recognized by the client system and displayed in window 122. Once the user enters the complete URL, the URL can be transmitted by selecting the "Return" key and then pressing "Enter" button 19. In response the client system will transmit the URL over network connection 29 in order to access the corresponding Web page.

Of course, a conventional keyboard (for example, a battery-powered IR keyboard) can be used optionally with the present invention. In that case, the user may directly enter text without the need to display a keyboard image on screen.

6. Revisiting Web Sites

Prior art Web browsers have certain limitations in the way they provide the "Forward" and "Back" functions, as described above (see "Background of the Invention"). In particular, analogizing Web browsing to moving through a tree hierarchy of Web pages, there is often ambiguity in the prior art when moving down one level (Web page) in the tree hierarchy to a level that was already visited, since there may be many branches (hypertext links) from each level. Further, if the user wishes to return to where he was after having backed up by several levels, he generally must remember the path he took to get there and then retrace his steps exactly. Therefore, the application software 31 includes a mechanism, known as the "Recent" function, which overcomes these limitations. The "Recent" function subsumes the "Forward" function while eliminating the above-described ambiguity and providing additional functionality.

The application software 31 maintains a history of the Web sites visited, including the associated logical address (e.g., URL) of each site, in order to allow the user to revisit Web sites. When the user presses Recent button 4, this saved information is retrieved, and a "Recent" display is generated including visual representations of several of the most recently visited Web sites, regardless of their positions in the tree hierarchy. The "Recent" display therefore represents a sequential history of Web sites recently visited prior to the current Web site.

Figure 12:
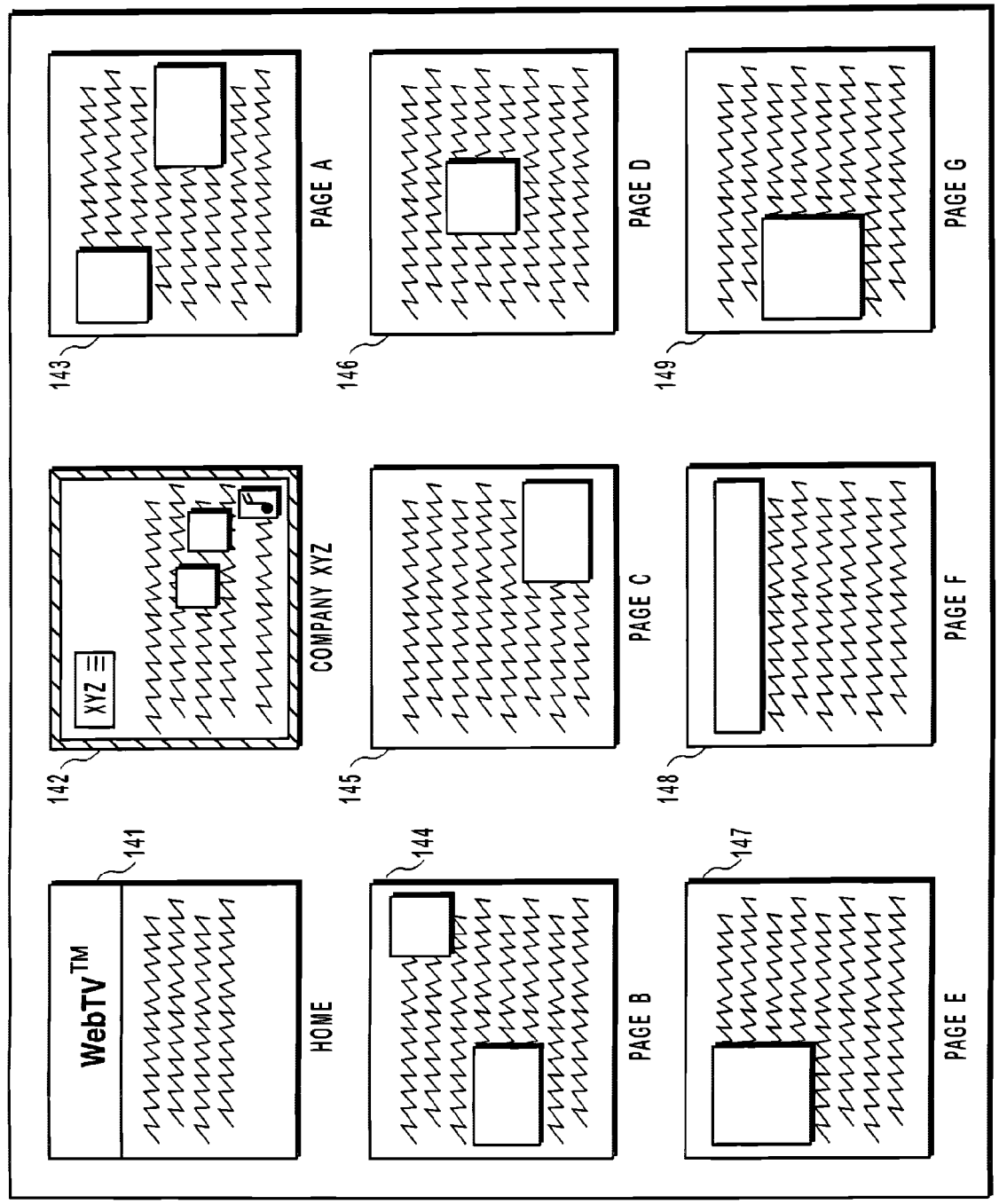
FIG. 12 illustrates an example of a display showing representations of recently visited Web sites.

FIG. 12 illustrates an example of a "Recent" display. The "Recent" display includes a number of images 141-149 displayed in row-and-column format. The images 141-149 are scaled-down images of the most recently visited Web pages. The user can press the directional buttons 15-18 to select one of the recent Web sites (the selected site being indicated by highlighting 118) and then press the Enter button 19 to return directly to the selected site. Note that the user can also directly return to the WebTV™ home page by selecting and entering image 141. The title of each represented Web page is also displayed with its associated image to allow the user to more easily identify the page. Hence, each time an HTML document representing a Web page is received, the title of the Web page, as specified in the HTML document, is saved as part of the historical information for later use with the "Recent" function.

When the user presses the Back button 36, the user is taken to the previously-visited Web page in reverse chronological order. That is, each time the Back button 36 is pressed, the user is taken up one level in the tree hierarchy. The application software 31 automatically causes the URL of that site to be invoked. In addition, the application software 31 also saves the selection that was entered by the user (using Enter button 19) at each Web site. Therefore, as each Web site is revisited in response to the Back button 36, the selectable that the user entered when he previously visited that site is automatically highlighted as the current selection. Hence, the user only needs to press the Enter button 19 to reverse direction and retrace his steps going forward (down the tree hierarchy). This feature allows the user to maintain his context for each Web page, which may be several screens long. In addition, if that selectable is a server-side image map, the selection icon (e.g., cross-hairs 119; see FIG. 8) is automatically displayed in the image map in response to the Back button 36, at the precise location at which it was located when the user pressed the Enter button 19.

As the user returns to each Web page moving forward, the selectable he previously chose at that page is automatically highlighted, as was the case when moving backward (up the tree). Consequently, if the user wishes to resume moving forward after having used the "Back" function, he is not required to remember which hypertext anchors he had originally selected. This feature, therefore, further serves to eliminate ambiguity associated with prior art "Forward" functions.

7. Favorites

The present invention provides a function by which the user can quickly access his favorite Web sites. In particular, the user may save any Web page he visits as a "Favorite". In addition, in one embodiment, the WebTV™ client 1 or the WebTV™ server 5 supplements the user-specified Favorites with a list of the Web sites most frequently visited by the user. The user can then select a "Favorites" menu item on the WebTV™ home page to see a representation of his favorite Web sites.

Selection of the "Favorites" menu item causes the user's favorite Web sites to be displayed in a form similar to that of the Recent display (see FIG. 12). That is, the "Favorites" display includes scaled-down images of various Web pages along with the title of each Web page. As with the Recent display, the user can directly access any Web site represented in the "Favorites" display by selecting one of the scaled-down images using the directional buttons 15-18 and Enter button 19.

8. Scrolling

By pressing Scroll Up button 8 or Scroll Down button 9, the user can cause the display to be scrolled up or down, respectively, to display undisplayed portions of the current Web page. The display is generally scrolled by approximately one entire screen. However, the amount of scrolling can be tuned to the user's preference. When scrolling down, the display will generally be scrolled so that the last currently-displayed line in the current HTML document becomes the top line of the new screen to be displayed. An exception occurs, however, if that HTML line is larger than one screen, as in the case of some large images and tables. In that case, the display is scrolled only by one screen. This technique provides the advantage that HTML lines containing large image maps or tables can be viewed more easily, since these lines will be lined up with the top of the screen when the user scrolls down.

When scrolling up, the display will generally be scrolled up so that the top line of the new screen is the highest fully visible HTML line of the previous screen. If that line is larger than one screen, however, then the display will only be scrolled up by one screen.

9. Audio Functions

The application software 31 includes the capability to cause music or sound effects to be played through a speaker of the television set 12 based on audio information received over the network connection 29. In the preferred embodiment, the audio information is in MIDI (Musical Instrument Digital Interface) format. Once decoded by the WebTV™ box 10, the received audio information is provided to the television set via an audio channel of video link 6. The WebTV™ network services provide MIDI audio information to the WebTV™ box 10 for the purpose of generating background music to the user. The application software 31 generally causes the background music to be played to the user while the user is either downloading or viewing Web pages. That is, MIDI sound information for generating background music is downloaded "on the fly" while views of other Web pages are downloaded, so that the user is provided with a continuous stream of music. In one embodiment, two or more songs are initially downloaded when the WebTV™ client system 1 initiates a connection to the server system 2. In order to provide a continuous stream of background music, one song is downloaded from the network while another song is being played to the user.

In one embodiment, the background music is suspended whenever a Web page has its own music, such that the background music associated with the Web page is played instead. Once the user leaves that Web page, the background music provided by the WebTV™ network services is resumed.

In addition, the application software 31 also provides certain special sound effects. The special sound effects are superimposed upon (i.e., played concurrently with) the background music. Some of the sound effects are used to provide the user with audio feedback when operating the remote control 11. For example, a specific sound effect is associated with each function of the remote control 11. Audio feedback such as this is advantageous, since the user of the present invention will likely be positioned farther from the display than he would be if he were using an ordinary personal computer to browse the Web.

Thus, a method and apparatus have been described for allowing a user to navigate between a plurality of hypertext objects displayed on a display device using a remote input device. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed and desired to be secured by United States Letters Patent is:

1. A computing system having a processor and a display device and being capable of accessing and displaying Internet documents, the computing system comprising:
   at least one processor; and
   at least one storage medium having stored instructions which, when executed by the at least one processor, implement a method of accessing a favorite Internet document in response to a user selecting a scaled-down version of an image associated with the favorite Internet document that is displayed to the user with scaled-down versions of images associated with other favorite Internet documents, and wherein the method comprises the acts of:
      receiving user input identifying an Internet document as being a favorite Internet document;
      in response to the user input, adding a scaled-down version of an image associated with the favorite Internet document to a favorites document stored at the client, the favorites document being configured to include scaled-down versions of images associated with other favorite Internet documents;
      displaying the favorites document on the display device;
      receiving user input selecting the scaled-down version of the image associated with a selected one of the favorite Internet documents; and
      in response to the user input, accessing and displaying on the display device said selected one of the favorite Internet documents, wherein the client system is one of a plurality of client systems that is in communication with the at least one server system, each of the client systems being capable of accessing Internet documents, and wherein at least one of the plurality of client systems uses a television as a display device for displaying the Internet documents.

2. A computing system as recited in claim 1, the method further comprising the act of including titles and addresses associated with the plurality of Internet documents in the favorites document, thereby facilitating direct access the selected favorite Internet document using the address associated with the selected favorite Internet document.

3. A computing system as recited in claim 1, wherein the act of adding the scaled-down version of the image to the favorites document comprises the act of retrieving the image from a cache maintained by a server, the server being remotely located from the computing system.

4. A computing system as recited in claim 1, wherein the act of adding the scaled-down version of the image to the favorites document comprises the act of retrieving the image from an Internet server using an address associated with the favorite Internet document.

5. A computing system as recited in claim 1, the method further comprising the acts of:
   receiving information indicating that the user has selected the scaled-down version of the image associated with the selected one of the favorite Internet documents; and
   providing access to the selected favorite Internet document.

6. A computing system as recited in claim 5, wherein the act of providing access to the selected favorite Internet document comprises the act of retrieving the selected favorite Internet document from an Internet server using an address associated with the selected favorite Internet document.

7. A computing system as recited in claim 1, wherein the scaled-down versions of the images are included in the document in a row-and-column format.

8. In a client system in communication with at least one server system in a network, the client system having a processor and a display device and being capable of accessing Internet documents, a method of accessing a favorite Internet document in response to a user selecting a scaled-down version of an image associated with the favorite Internet document that is displayed to the user with scaled-down versions of images associated with other favorite Internet documents, the method comprising the acts of:
   receiving user input identifying an Internet document as being a favorite Internet document;
   in response to the user input, adding a scaled-down version of an image associated with the favorite Internet document to a favorites document stored at the client, the favorites document being configured to include scaled-down versions of images associated with other favorite Internet documents;
   displaying the favorites document on the display device;
   receiving user input selecting the scaled-down version of the image associated with a selected one of the favorite Internet documents; and
   in response to the user input, accessing and displaying on the display device said selected one of the favorite Internet documents, wherein the client system is one of a plurality of client systems that is in communication with the at least one server system, each of the client systems being capable of accessing Internet documents, and wherein at least one of the plurality of client systems uses a television as a display device for displaying the Internet documents.

9. A method as recited in claim 8, further comprising the act of storing titles and addresses and title associated with the favorite Internet documents.

10. A method as recited in claim 9, wherein the act of displaying the favorites document comprises the act of displaying in the favorites document the titles associated with the favorite Internet documents.

11. A method as recited in claim 8, wherein the act of adding the scaled-down version of the image to the favorites document comprises the act of scaling down a full-sized version of the image associated with the favorite Internet document.

12. A method as recited in claim 8, wherein the scaled-down versions of the images are included in the favorites document in a row-and-column format.

13. A method as recited in claim 8, wherein the act of accessing said selected favorite Internet document comprises the act of transmitting an address associated with said selected favorite Internet document to a proxying server, which in turn access the selected favorite Internet document using the address.

14. A method as recited in claim 8, wherein the act of accessing said selected favorite Internet document comprises the act of using an address associated with said selected favorite Internet document without transmitting the address to a proxying server.

15. The computing system recited in claim 1, wherein a plurality of client systems, including the computing system, are in communication with one or more server systems, each of the client systems being capable of accessing Internet documents, and wherein at least one of the plurality of client systems uses a television as a display device, the method further comprising the act of scaling down a visual representation of the identified favorite Internet document such that the favorites document may be displayed without horizontal scrolling.

16. A method as recited in claim 8, wherein the method further comprising an act of scaling down a visual representation of the favorite Internet document such that the favorites document may be displayed without horizontal scrolling.

17. In a client system in communication with at least one server system in a network, the client system having a processor and a display device and being capable of accessing Internet documents, a computer program product comprising a computer-readable storage device carrying computer-executable instructions that implement a method of accessing a favorite Internet document in response to a user selecting a scaled-down version of an image associated with the favorite Internet document that is displayed to the user with scaled-down versions of images associated with other favorite Internet documents, the method comprising the acts of:

receiving user input identifying an Internet document as being a favorite Internet document;

in response to the user input, adding a scaled-down version of an image associated with the favorite Internet document to a favorites document stored at the client, the favorites document including other scaled-down versions of images associated with other favorite Internet documents;

displaying the favorites document on the display device;

receiving user input selecting the scaled-down version of the image associated with a selected one of the favorite Internet documents; and in response to the user input, accessing and displaying on the display device said selected one of the favorite Internet documents, wherein the client system is one of a plurality of client systems that is in communication with the at least one server system, each of the client systems being capable of accessing Internet documents, and wherein at least one of the plurality of client systems uses a television as a display device for displaying the Internet documents.

18. A computer program product as recited in claim 17, wherein the method further comprises an act of storing titles and addresses and title associated with the favorite Internet documents.

19. A computer program product as recited in claim 18, wherein the act of displaying the favorites document comprises the act of displaying in the favorites document the titles associated with the favorite Internet documents.

20. A computer program product as recited in claim 17, wherein the act of adding the scaled-down version of the image to the favorites document comprises the act of scaling down a full-sized version of the image associated with the favorite Internet document.

21. A computer program product as recited in claim 17, wherein the act of accessing said selected favorite Internet document comprises the act of transmitting an address associated with said selected favorite Internet document to a proxying server, which in turn access the selected favorite Internet document using the address.

22. A computer program product as recited in claim 17, wherein the act of accessing said selected favorite Internet document comprises the act of using an address associated with said selected favorite Internet document without transmitting the address to a proxying server.

\* \* \* \* \*